US009635930B2

(12) United States Patent
Korb et al.

(10) Patent No.: US 9,635,930 B2
(45) Date of Patent: May 2, 2017

(54) TABLE SYSTEM

(71) Applicant: DSA International, LLC, Zeeland, MI (US)

(72) Inventors: Daniel Korb, Baden (CH); Adam Meeuwsen, Grandville, MI (US); Gary Petertyl, Grand Rapids, MI (US); Tod Babick, Grand Rapids, MI (US)

(73) Assignee: DSA International, LLC, Zeeland, MI (US)

( * ) Notice: Subject to any disclaimer, the term of this patent is extended or adjusted under 35 U.S.C. 154(b) by 154 days.

(21) Appl. No.: 14/603,983

(22) Filed: Jan. 23, 2015

(65) Prior Publication Data
US 2015/0150370 A1 Jun. 4, 2015

Related U.S. Application Data

(63) Continuation-in-part of application No. 13/248,384, filed on Sep. 29, 2011, now Pat. No. 8,939,092.

(30) Foreign Application Priority Data

Sep. 29, 2010 (DE) ........................ 10 2010 037 837

(51) Int. Cl.
| A47B 9/08 | (2006.01) |
| A47B 13/00 | (2006.01) |
| A47B 13/02 | (2006.01) |
| A47B 13/06 | (2006.01) |
| A47B 83/02 | (2006.01) |
| A47B 87/00 | (2006.01) |
| F16B 12/20 | (2006.01) |

(52) U.S. Cl.
CPC ............ *A47B 13/003* (2013.01); *A47B 13/02* (2013.01); *A47B 13/06* (2013.01); *A47B 83/02* (2013.01); *A47B 87/002* (2013.01); *F16B 12/20* (2013.01)

(58) Field of Classification Search
CPC ....... A47B 13/003; A47B 13/02; A47B 13/06; A47B 83/02; A47B 83/002; F16B 12/20
USPC ..................... 108/153.1, 155, 158.11–158.13
See application file for complete search history.

(56) References Cited

U.S. PATENT DOCUMENTS

| 2,380,379 | A | * | 7/1945 | Attwood | ............... | A47B 13/003 |
| | | | | | | 211/189 |
| 3,544,125 | A | * | 12/1970 | Unno | ..................... | A47B 13/06 |
| | | | | | | 280/31 |
| 3,851,981 | A | * | 12/1974 | Corsi | ..................... | A47B 13/00 |
| | | | | | | 312/140 |
| 4,382,642 | A | * | 5/1983 | Burdick | ............... | A47B 13/003 |
| | | | | | | 248/188.7 |
| 5,666,888 | A | * | 9/1997 | Dame | ...................... | A47B 9/06 |
| | | | | | | 108/143 |

(Continued)

*Primary Examiner* — Daniel J Troy
*Assistant Examiner* — Timothy M Ayres
(74) *Attorney, Agent, or Firm* — Niro McAndrews, LLC

(57) ABSTRACT

Provided is a table system that allows for multiple table frame arrangements using various combinations of fundamental building pieces. An adjustable height table leg includes two parallel and horizontal slots adapted to receive and clamp two independent frame members of the frame. The frame members may be bent or angled in a plurality of configurations to achieve a desired shape for the table frame. Sections of the frame members may also include apertures through which fasteners may be threaded to connect two frame members at right angles.

9 Claims, 39 Drawing Sheets

(56) References Cited

U.S. PATENT DOCUMENTS

| | | | |
|---|---|---|---|
| 7,036,438 B2 * | 5/2006 | Okamoto | A47B 17/02 108/153.1 |
| 8,939,092 B2 * | 1/2015 | Korb | A47B 13/02 108/158.13 |
| 2010/0246888 A1 * | 9/2010 | Bontus | A61B 6/027 382/103 |

* cited by examiner

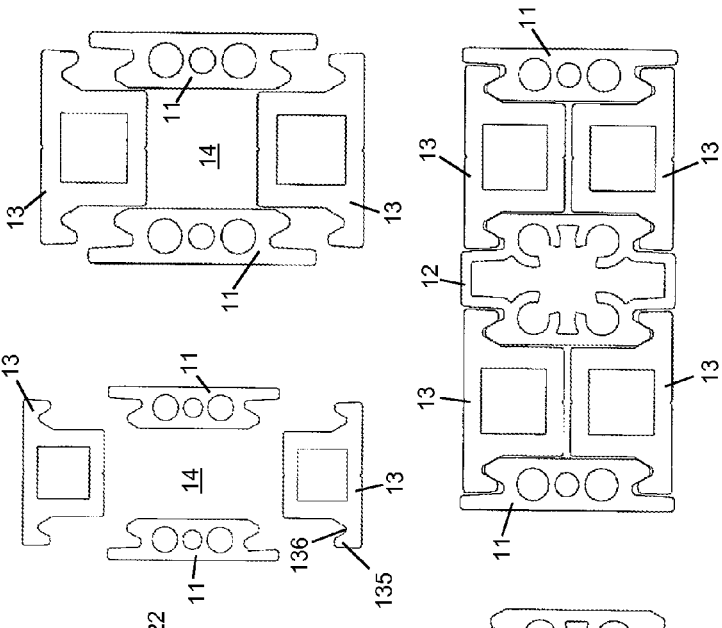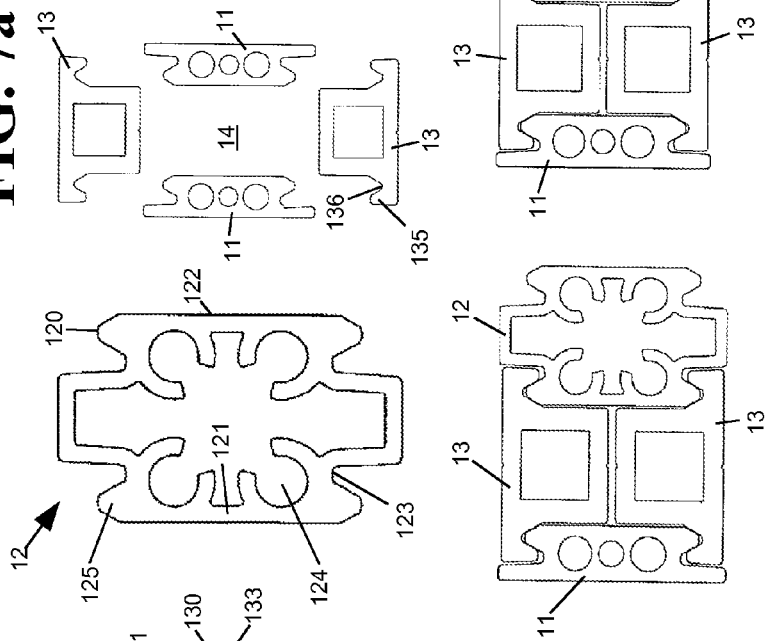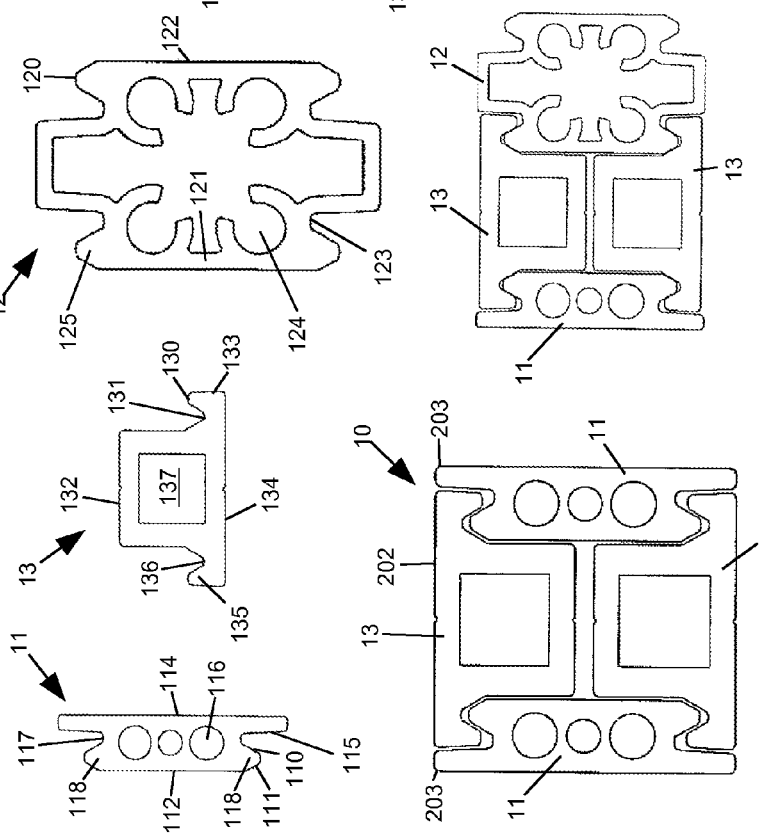

FIG. 12a
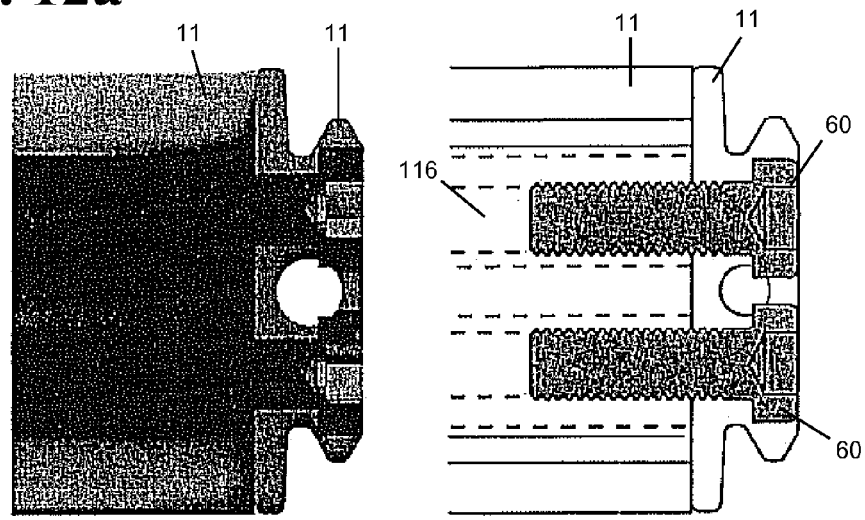
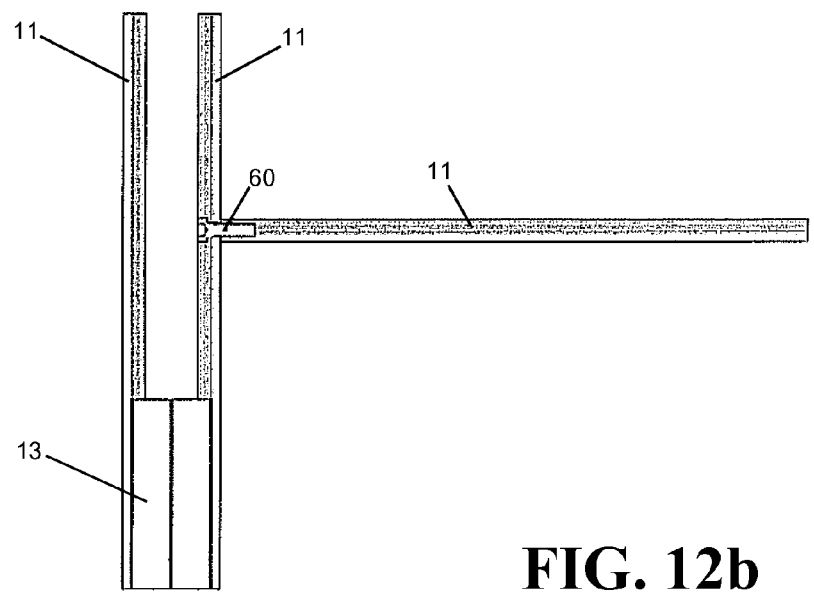
FIG. 12b

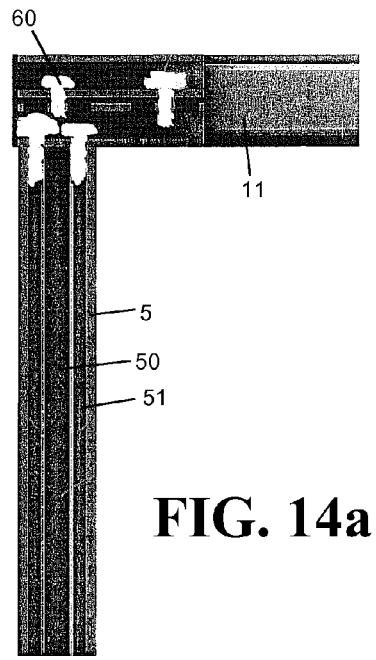
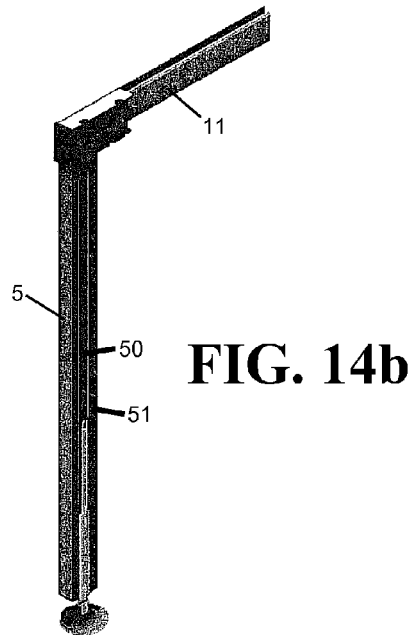
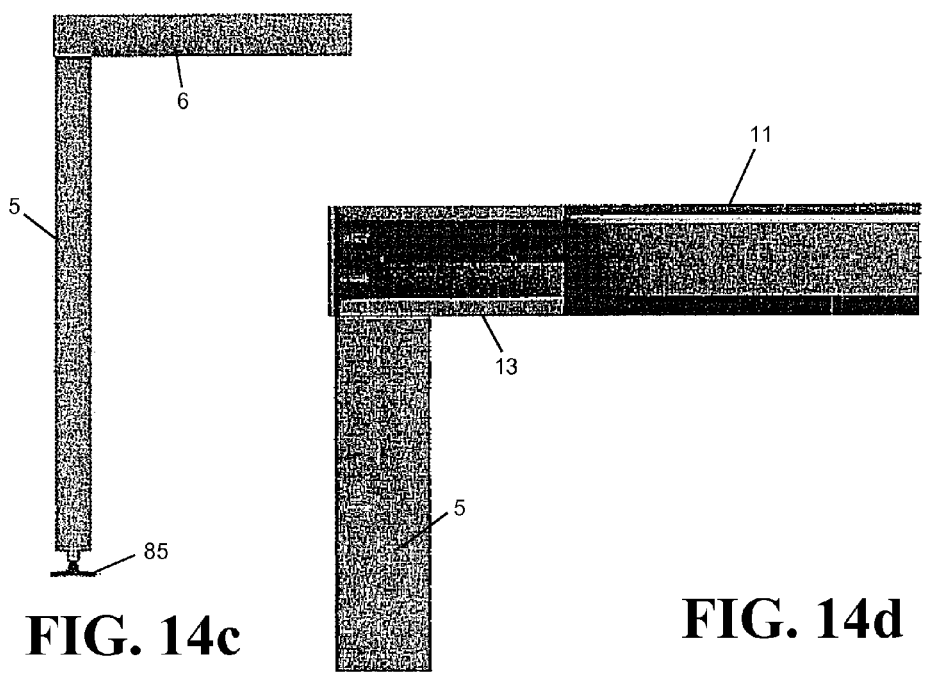
FIG. 14a
FIG. 14b
FIG. 14c
FIG. 14d

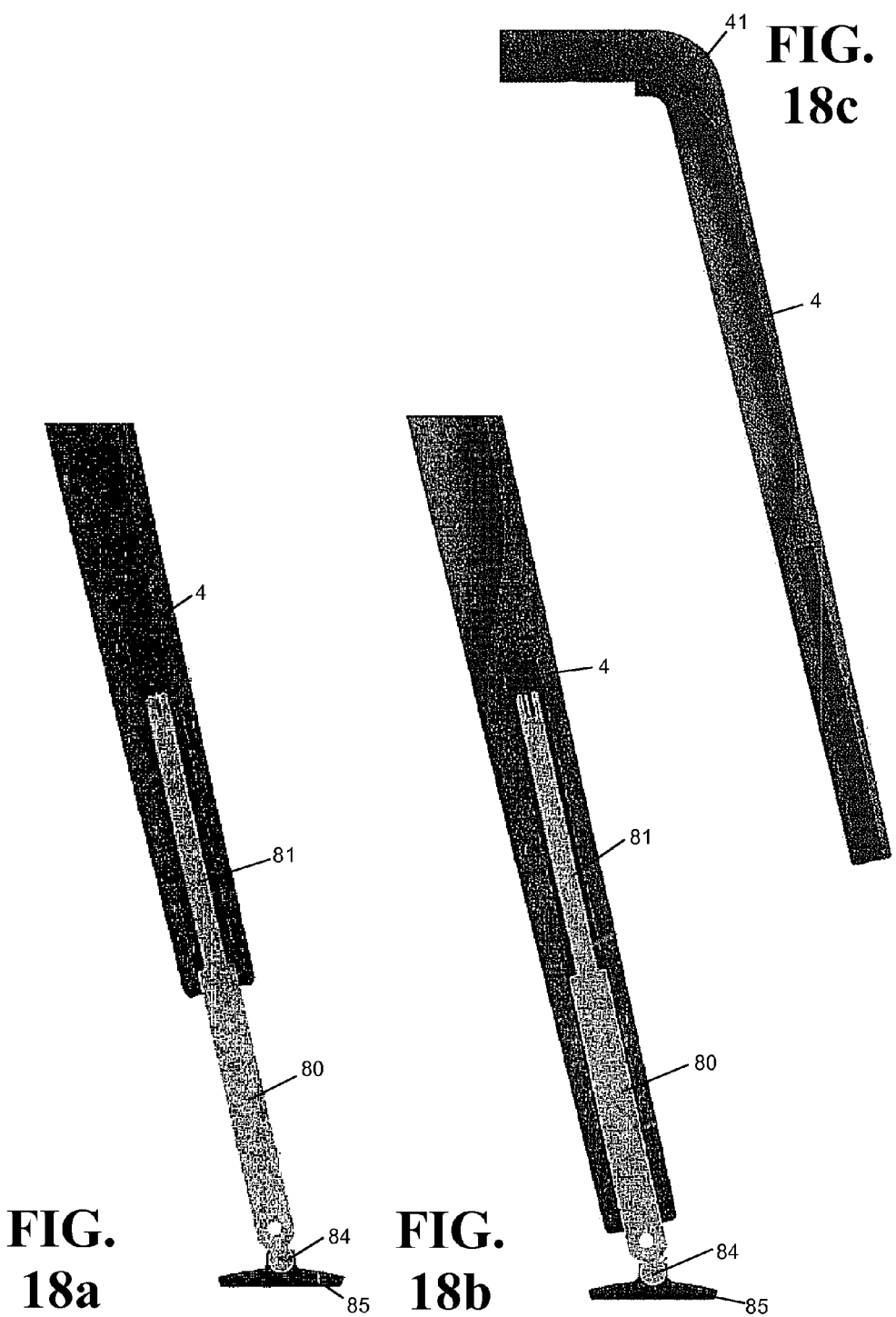

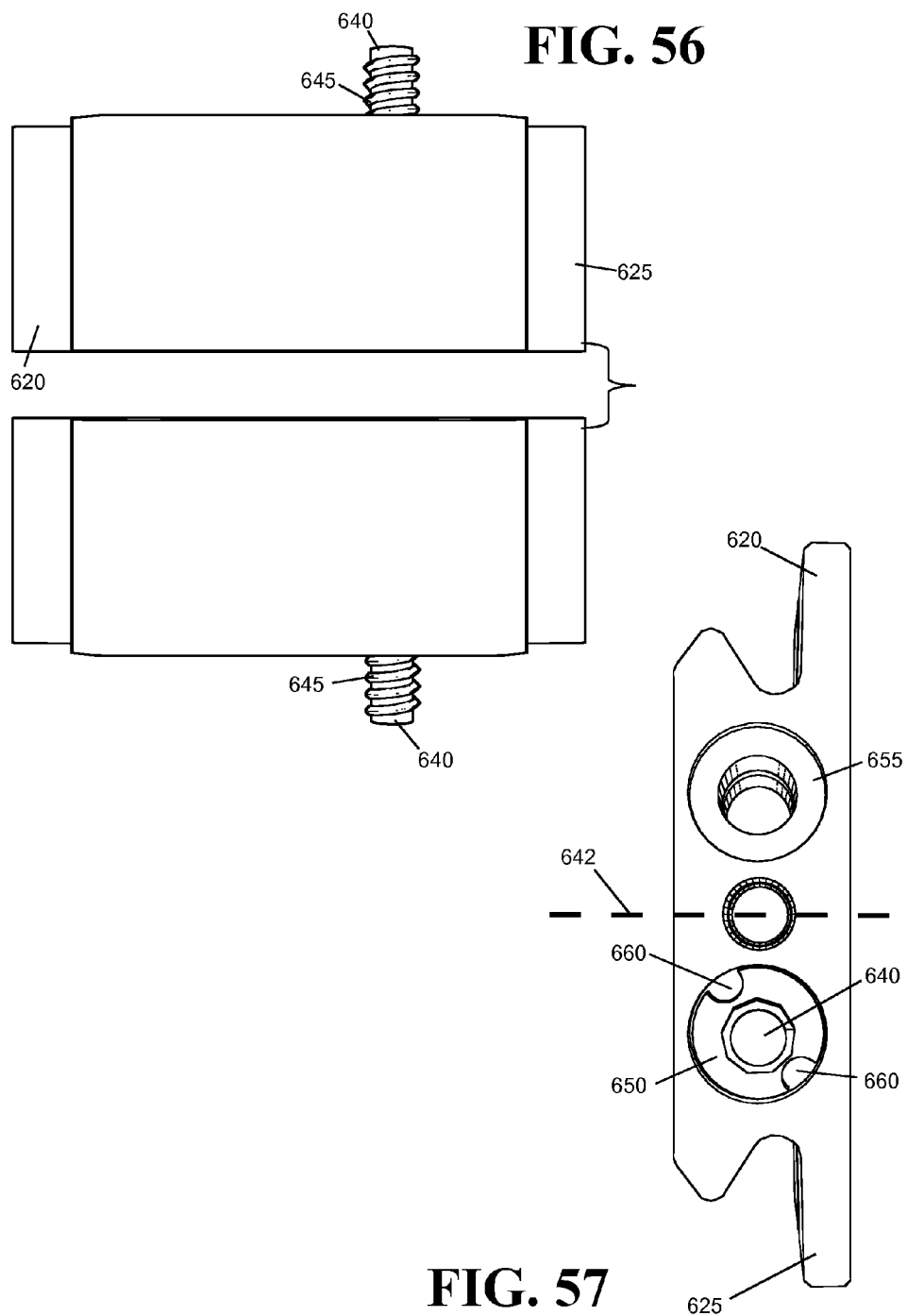

TABLE SYSTEM

REFERENCE TO CO-PENDING APPLICATION

This application is a continuation-in-part of U.S. patent application Ser. No. 13/248,384 titled "Table System" that was filed on Sep. 29, 2011 and issued as U.S. Pat. No. 8,939,092 on Jan. 27, 2015 by Daniel Korb and claims priority to German patent application serial No. DE201010037837, entitled "Tischsystem" filed Sep. 29, 2010 by Daniel Korb, the entire contents of which are all herein incorporated by reference.

FIELD OF THE INVENTION

The present invention relates generally to tables, and more particularly to a table system with a table top supported by table legs and a table frame having at least one cross strut or longitudinal strut.

BACKGROUND OF THE INVENTION

Tables, such as those disclosed in EP0669092 by Daniel Korb, have been designed with frame members supporting an independent table top surface. In EP0669092 the frame structure was designed to be configurable into a plurality of combinations so that frame components could be used in multiple scenarios. While the frame in EP0669092 is a multifaceted table structure with high stability, it requires the table frame cross-bridges to be quite substantial and much of the material is lavishly designed, so the overall table design has a correspondingly complex and heavy construction.

DE19725045 by Daniel Korb shows another table with frame members and a cross-bridge. The frame members have substantially round cross-sections and provide support for the cross bridges. The cross-bridges are equipped with end-claw-like terminal elements for attachment to the frame members. The particular cross-bridges and frame members are designed for a specific table design that results in the table being relatively expensive to mass produce.

SUMMARY OF THE INVENTION

The present invention provides a table system that allows for multiple table frame arrangements using various combinations of fundamental building pieces. Adjustable height table legs include two parallel and horizontal slots adapted to receive and clamp two independent frame members. The frame members may be bent or angled in a plurality of configurations to achieve a desired shape for the table frame. Sections of the frame members may also include apertures through which fasteners may be threaded to connect two frame members at right angles.

BRIEF DESCRIPTION OF THE DRAWINGS

FIG. 4 shows a cross section of a frame member.

FIG. 5 shows a partial cross section of a clamping mechanism.

FIG. 6 shows a cross section of a frame spacer.

FIG. 7a shows a cross section of a clamping mechanism and two frame members.

FIG. 7b shows a partially exploded cross sectional view of a clamping mechanism secured to two frame members.

FIG. 7c shows a cross sectional view of a clamping mechanism and two frame members.

FIG. 8a shows a cross sectional view of a frame member, a clamping mechanism, and a frame spacer.

FIG. 8B shows a cross sectional view of two frame members and two clamping mechanisms separated by a frame spacer.

FIG. 12a is a cross sectional view of two frame members secured together in a perpendicular configuration with two fasteners.

FIG. 12b is a top view of two parallel frame members and a third frame member secured perpendicular to one of the parallel frame members.

FIG. 13a is a side view of two table legs, wherein each table leg has a clamping mechanism secured to a first and second horizontal frame member.

FIG. 13b is a front view of the assembly of FIG. 13a.

FIG. 14a side cut out view of a table leg secured to a frame member through a clamping mechanism.

FIG. 14b is a perspective view of the assembly of FIG. 14a.

FIG. 14c is a side view of the assembly of FIG. 14a.

FIG. 14d is a partial cutout view of the assembly of FIG. 14a.

FIG. 18a illustrates a slanted table leg with a height adjustment mechanism fully extended.

FIG. 18b illustrates a slanted table leg with a height adjustment mechanism fully retracted.

FIG. 18c illustrates a slanted table leg without a height adjustment mechanism.

FIG. 56 is a side elevational view of a frame section with a tensioning system.

FIG. 57 is a frontal elevational view of a frame section with a tensioning system.

DETAILED DESCRIPTION

The present invention may be used with any type of top surface and is particularly suited for tables and applications requiring a lightweight, rigid, and robust frame that may be used in multiple configurations. The improved modular frame may be used with various objects such as chairs, stools, benches, and tables. However, for descriptive purposes, the present invention will be described in use with a table.

Figure 1:
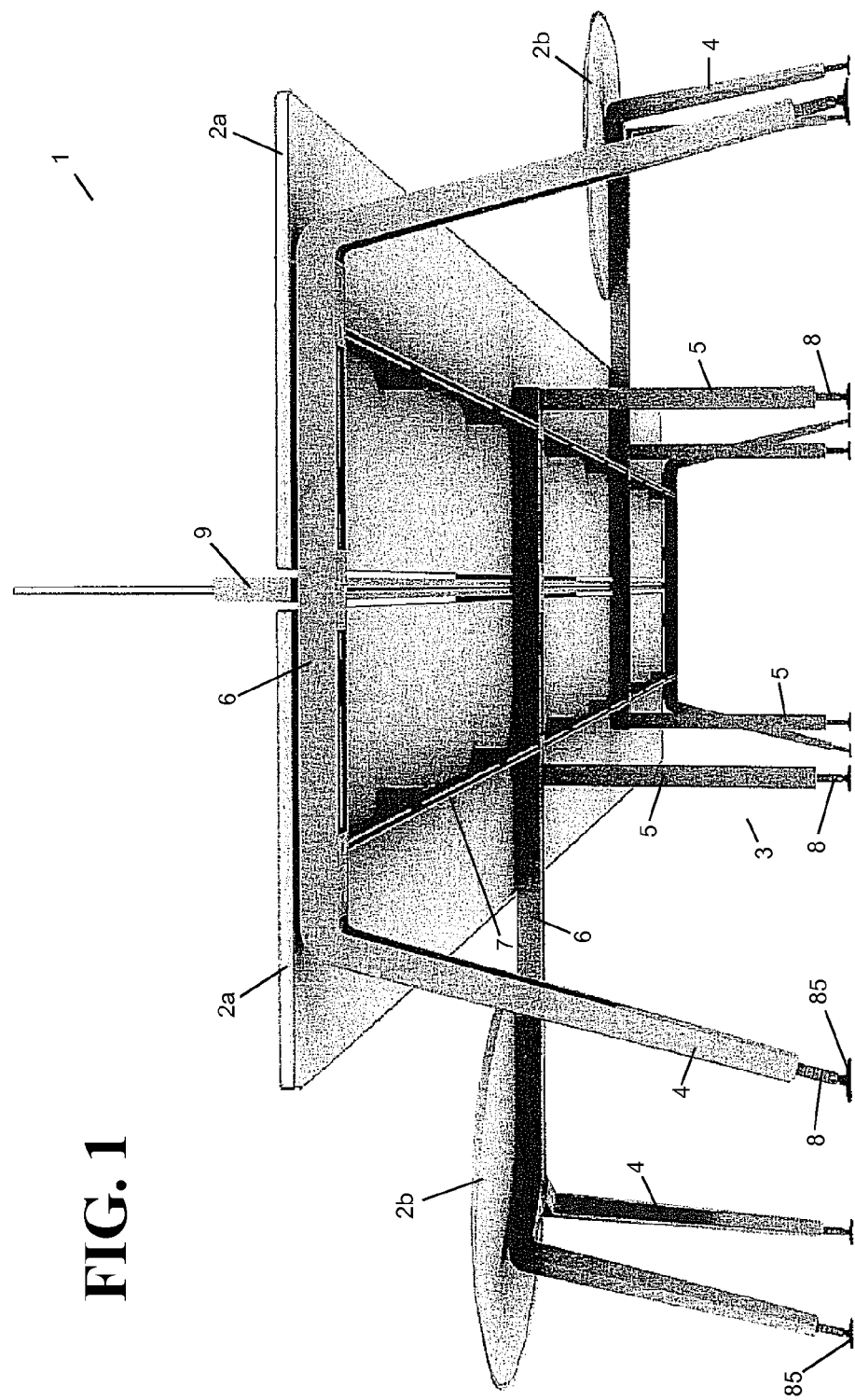
FIG. 1 shows a table system with a frame and several table tops in a lower perspective side view.

FIG. 1 shows a table system 1 with a table frame 3 on which two rectangular table tops 2a, and two round table tops 2b are attached using fasteners on the top of the table frame 3. The table frame is constructed of a frame with a first cross brace 6 and a second cross brace 7 as well as longitudinal struts extending to the frame-mounted inclined legs 4 and four vertical legs 5. In the central longitudinal axis on the table frame 3, a vertical construction 9 with two vertical panels and a vertical plate is attached to the top side by retaining elements such as those shown in FIGS. 2 and 3. The vertical legs 5 and the inclined legs 4 are equipped with height adjustment units 8 in their lower sections to adjust the height of the table legs. The table legs also include a foot plate 85 at the bottom edge of the height adjustment units to prevent damage to the floor surface below the table. In the upper portion of the inclined legs 4, there are integral clamping mechanisms that interlock with the cross braces. The vertical legs 5 are releasably secured to separate clamping mechanisms that connect to the horizontal cross braces. The second cross braces 7 extend along the length of the table while the first cross braces 6 extend along the width of the table and are secured to the clamping mechanisms and the second cross braces.

Figure 2:
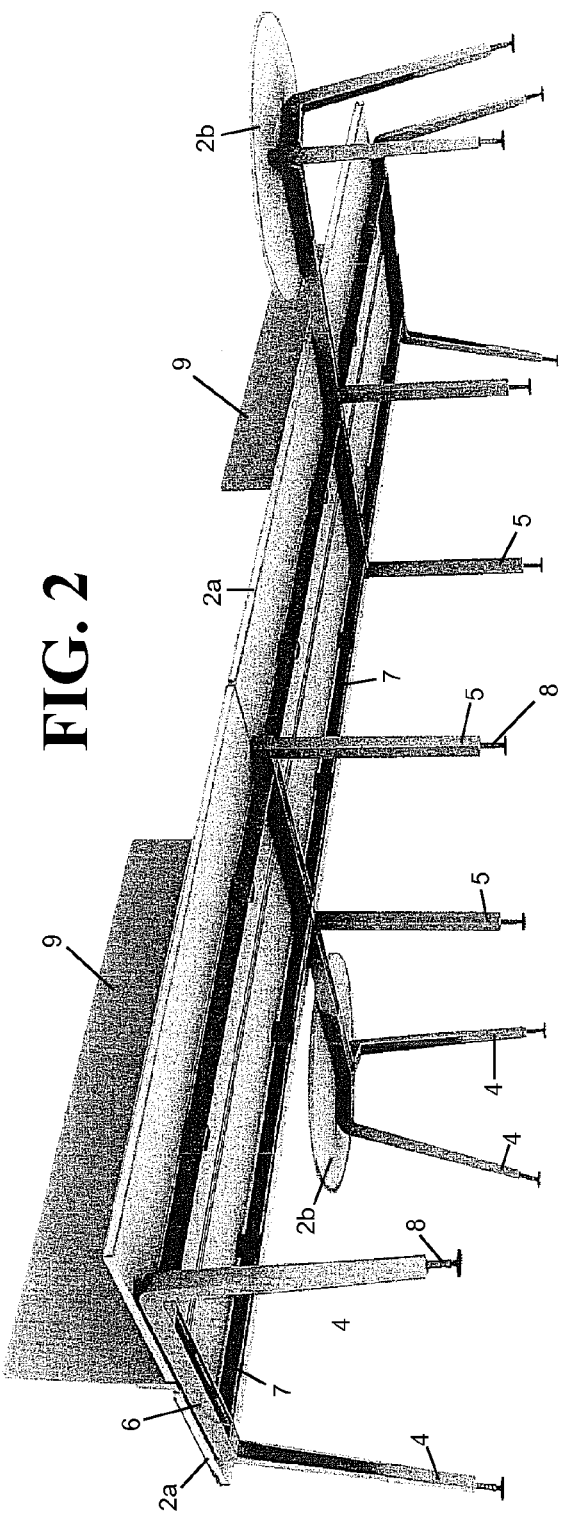
FIG. 2 shows the system of FIG. 1 in another lower perspective view from the side.
Figure 3:
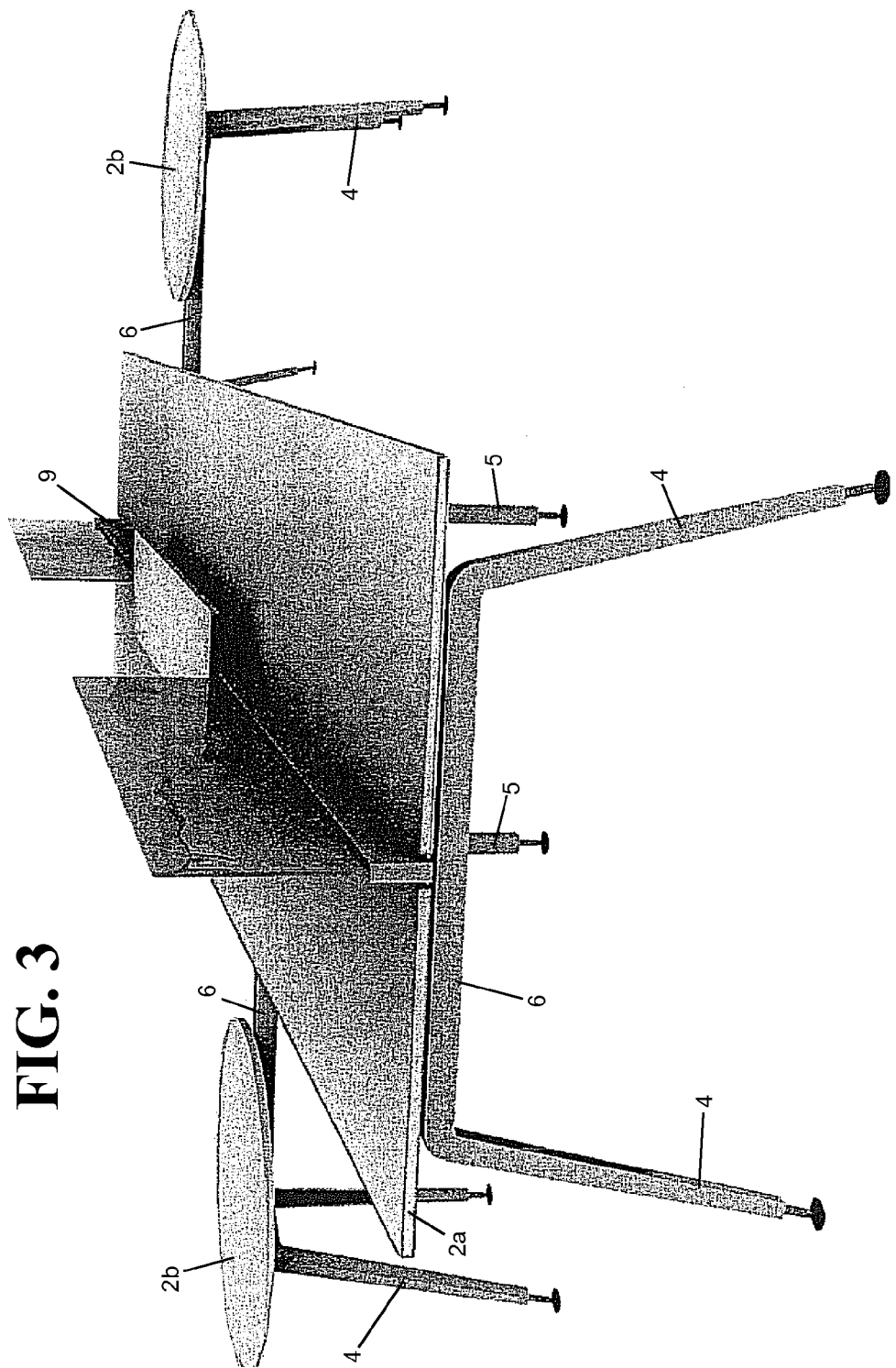
FIG. 3 shows the system of FIG. 1 in an upper perspective view.

A notable feature of the table system shown in FIGS. 1-3 is that the cross braces are constructed from an assembly 10 of two frame sections 11 that are held together by a clamping mechanism having two clamp sections 13 as shown in the cross-sectional views in FIGS. 4, 5, 7a-7c. FIG. 6 shows a frame spacer 12 that is highlighted in FIGS. 8a and 8b. As an example, in FIG. 8b the frame spacer 12 may be used to join two adjacent inclined legs.

As shown in FIG. 4, the frame sections 11 have a flat profile with a first flat side 112 that is parallel to and slightly shorter than a second flat side 114 with terminal portions 110 that are formed in the transition between the first and second flat sides (112, 114). In the body of the frame sections 112 there are longitudinal channels 116 in which fasteners may be secured. Alternatively, the longitudinal channels in the frame sections may be used solely to reduce the weight of the frame sections. In the illustrated example, the frame sections 11 are symmetrical about a plane extending perpendicular to the first and second flat sides (112, 114). The terminal portions 110 of the frame sections 11 include asymmetrical V-shaped grooves 117 that are less steep and shorter towards the first flat side 112 and longer and steeper towards the second flat side 114. The longitudinal groove 117 and the first flat side 112 results in a projection 118 that is shorter than a longitudinal groove 117 between the second flat side 114. The steeper slope includes a transition area 115 that extends further away from the plane of symmetry than the projection 118. The projection 118 includes a bevel 111 towards the first flat side 112 such that the projection has a substantially conical cross section. The thickness of the frame section 11 between the first and second flat sides (112, 114) is typically between one third and one sixth of the length of the longer second flat side 114, however other thicknesses are within the scope of the present invention. With this aspect ratio of height to width, the frame sections are relatively easy to bend in the horizontal plane, however they provide a high degree of rigidity and mechanical stability in the vertical direction.

Shown in FIG. 5 is a cross-section of a clamp section 13 having a substantially T-shape. The end portions 130 of the clamp section have a protrusion 135 and a valley 136 that are configured to interlock with the projections 118 and grooves of the frame sections 11. The narrow end sides 133 of the end portions have a shape that is substantially defined by the transition area 115 of the frame sections 11.

The clamp section 13 has a flat longer side 134 that is parallel to a flat upper shorter side 132 and perpendicular to the flat side surfaces 131. Within the clamp section 13 is a longitudinal channel 137 that may include threading for securing fasteners through to the clamp section 13. The longitudinal channel may also be used to reduce the weight of material used in the construction of the clamp section 13.

FIGS. 7a, 7b, and 7c show two parallel frame sections 11 and two clamp sections 13 cooperating to form a clamping mechanism. Between the first flat sides of the frame sections is a gap 14. The protrusions 135 of the clamp sections interlock with the grooves 117 of the frame sections while the projections of the frame 118 interlock with the valleys of the clamp sections. Additionally, the shorter first sides of the frame sections are adapted to be pressed against the flat side surfaces of the clamp sections. Apertures through the flat longer side 134 and flat shorter side 132 may also be provided through which fasteners may secure two clamping sections together to form a clamping mechanism. The clamping sections 13 are sized so that when the clamping mechanism has locked in a frame section, the flat shorter sides 132 of the clamping sections are in close proximity, but not touching. As shown in FIG. 7c, two clamping sections 13 and two frame sections 11 combine can combine into a base unit 10 that has a substantially rectangular cross section. Due to the tight fit of the narrow sides 133 of the clamping sections against the transition areas 115 of the frame sections, the base unit 10 may have the appearance of a single continuous unit. The upper and lower clamping sections of the base unit may have a substantially equal length, however it is within the scope of the present invention to use clamping sections of unequal size. Using multiple lower clamping sections with a single upper clamping section is contemplated by the inventor.

Shown in FIG. 6 is a frame spacer 12 that has twice the thickness of a frame section and a cross section with an outer contour that is similar to the inner contours of frame sections in a base unit. The frame spacer is configured to be secured to two separated clamping mechanisms. The frame spacer has parallel flat sides 122, grooves 123, and projections 125 similar to the frame sections. The frame spacer also has a longitudinal cavity 124 that may be adapted to receive fasteners, or may be structured to reduce the weight of the frame spacer while maintaining the structural rigidity of the frame spacer.

As shown in FIGS. 8a and 8b, the base units 10 of the table system may be constructed from a various combinations of frame spacers 12, clamping sections 13, and frame sections 11. The use of multiple clamping sections secured to multiple table legs may be used when it is desired to link two or more tables together. Alternatively, two adjacent table legs with two adjacent clamping sections may be used for a single table top that is expected to carry a substantial load.

Figures 9A, 9B:
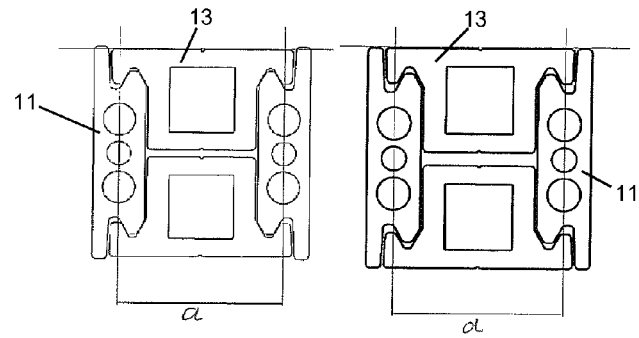
FIG. 9a illustrates a cross sectional view of an uncoated clamping mechanism and frame members.
FIG. 9b illustrates a cross sectional view of a powder coated clamping mechanism and powder coated frame members.
Figure 10A:
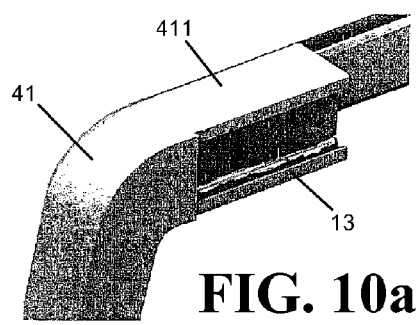
FIG. 10a is a perspective view of a table leg with a clamping mechanism secured to a single frame member.
Figure 10B:
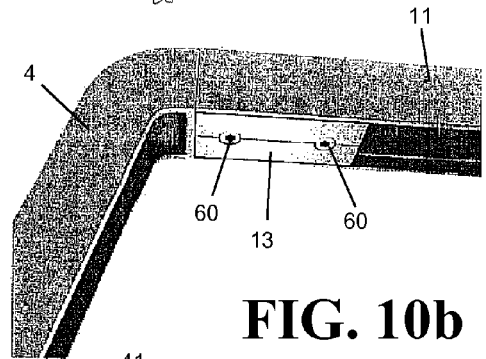
FIG. 10b is a bottom perspective view of a table leg with a clamping mechanism secured to two frame members.
Figure 10C:
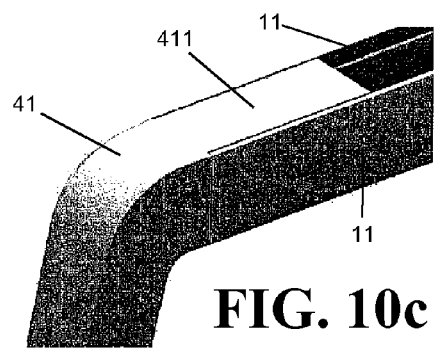
FIG. 10c is a side perspective view of a table leg with a clamping mechanism secured to two frame members.
Figure 10D:
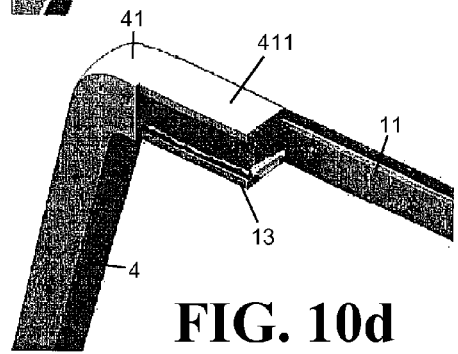
FIG. 10d is a top perspective view of a table leg with a clamping mechanism secured to a single frame member.
Figure 10E:
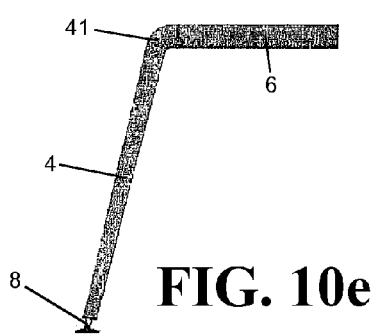
FIG. 10e is a side view of a table leg secured to a horizontal frame member.
Figure 10F:
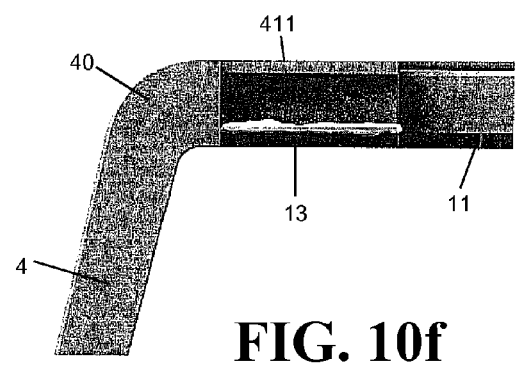
FIG. 10f is a side view of a table leg with a clamping mechanism secured to a single frame member.

In FIGS. 9a and 9b are shown two base units. In FIG. 9a, the frame sections 11 and clamping sections 13 are uncoated, while in FIG. 9b the frame sections and clamping sections have been powder-coated. The additional thickness provided by the powder-coating results in the upper and lower surfaces of the base unit being substantially flat. In the uncoated base unit, the clamping sections are slightly depressed into the base unit, however the unevenness of the unit is only detectable under close inspection.

FIGS. 10a through 10f show various views of slanted table legs 4 that have a bent upper area 41 that extends to an integrally formed clamping section 411. The bottom of the base unit is a clamping section 13 that is comprised of a separate clamping plate through which screws 60 may be used to secure the clamping plate to the integrally formed clamping section. Since the clamping plate is flush with the frame sections or depressed into the base unit, the clamping plate is not readily visible from above the frame structure. In the illustrated example the clamping plate is located below the integrally formed clamping section of the table leg; however the inventor contemplates other embodiments of the invention wherein the clamping plate is located above the integrally formed clamping section.

Figure 11A:
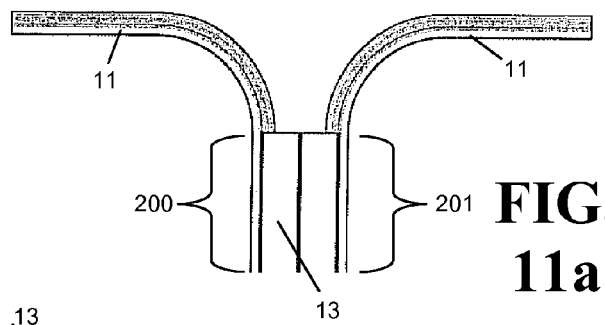
FIG. 11a is a top view of a clamping member, with two parallel slots, secured to two bent frame members that extend away from the clamping mechanism and each other.
Figure 11B:
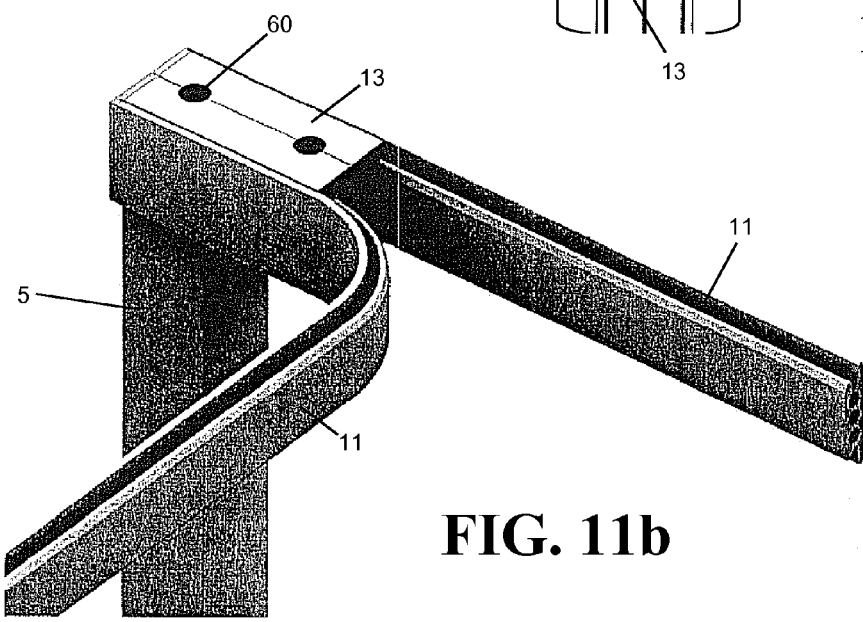
FIG. 11b is a top perspective view of a clamping member, with two parallel slots, secured to both a linear horizontal frame member and a bent horizontal frame member, wherein the bent frame member is parallel to the linear frame member at the clamping mechanism and the bent frame member is perpendicular to the linear frame member distant from the clamping mechanism.
Figure 11C:
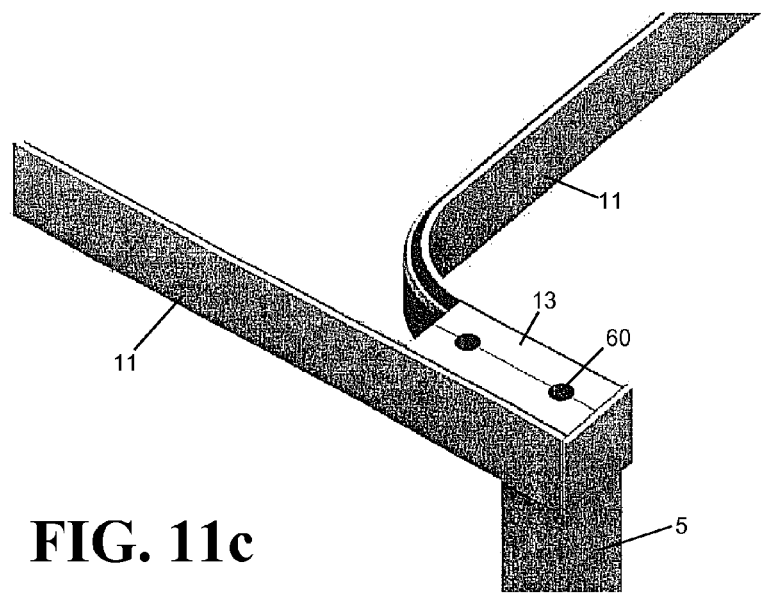
FIG. 11c is a top perspective view of a clamping member, with two parallel slots, secured to both a linear horizontal frame member and a bent horizontal frame member.

FIGS. 11a, 11b, and 11c illustrate an example of a base unit secured to a vertical table leg. The lower clamping section 13 of the base unit may be integrally formed as part of the table leg, or alternatively, the table leg may be separable from all parts of the base unit. In the illustrated example, the upper clamping section 13 is comprised of a clamping plate having apertures through which screws may be passed to secure the upper clamping section to the lower clamping section. If the lower clamping section is separable from the table leg, bolts and other fasteners may be used to secure the lower clamping section to the vertical table leg as shown in FIGS. 14a and 14b. By having four separate frame sections secured to a base unit with a single vertical leg, multiple frame sections may be used as a single supported cross bar that has a length greater than the length of the individual frame sections. As showing in FIGS. 11a through 11c, while the frame sections are parallel to each other in the base unit, they may bend away from each other at various angles such as 90 degrees shown in FIGS. 11b and 11c, or 180 degrees as shown in FIG. 11a.

Figure 12C:
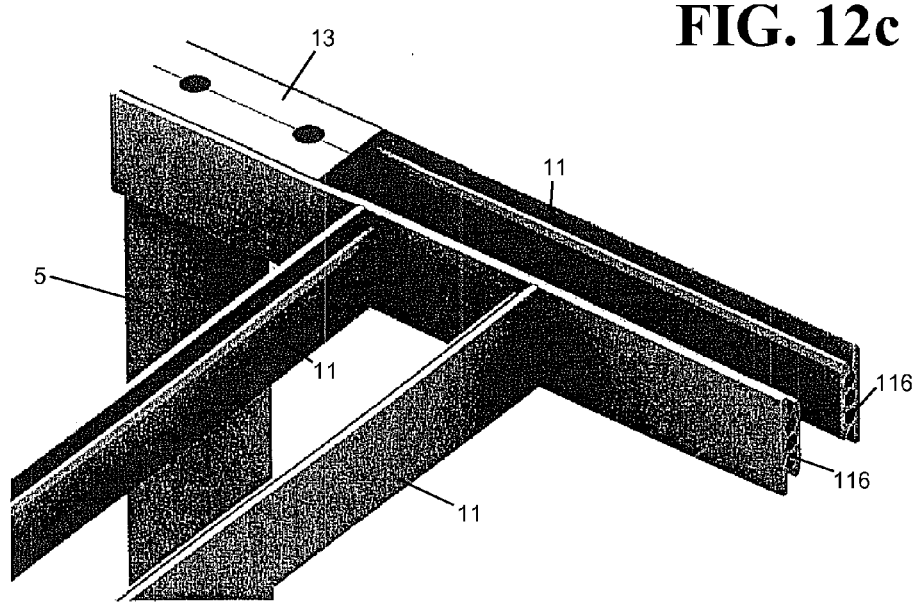
FIG. 12c is a front top view of two parallel frame members secured to a clamping mechanism, wherein third and fourth frame members are secured perpendicular to one of the parallel frame members.
Figure 12D:
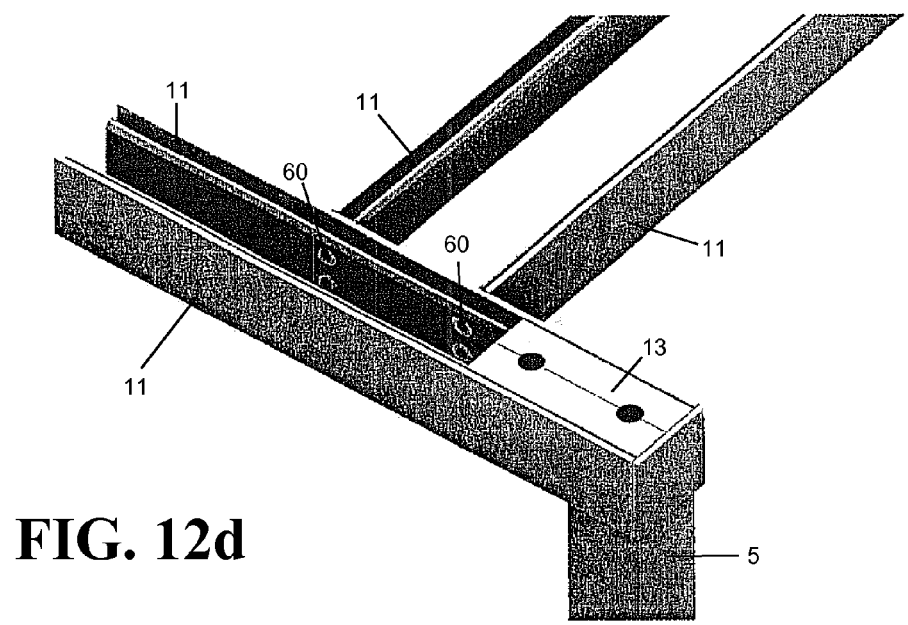
FIG. 12d is a rear top view of two parallel frame members secured to a clamping mechanism, wherein third and fourth frame members are secured perpendicular to one of the parallel frame members.

FIGS. 12a through 12d show frame sections 11 perpendicularly connected to other frame sections 11 to form cross braces. FIG. 12a illustrates a cross section of two intersecting frame sections that are held together with screws 60. One of the frame sections includes longitudinal channels 116 that have been threaded so that the screws may be securely fastened into the channels. As shown in FIGS. 12b, 12c, and 12d the inner frame section of the cross brace includes apertures through which the screws are threaded. By hiding the screws with an outer frame section, the frame structure presents a more refined appearance.

Figures 13A, 13B:
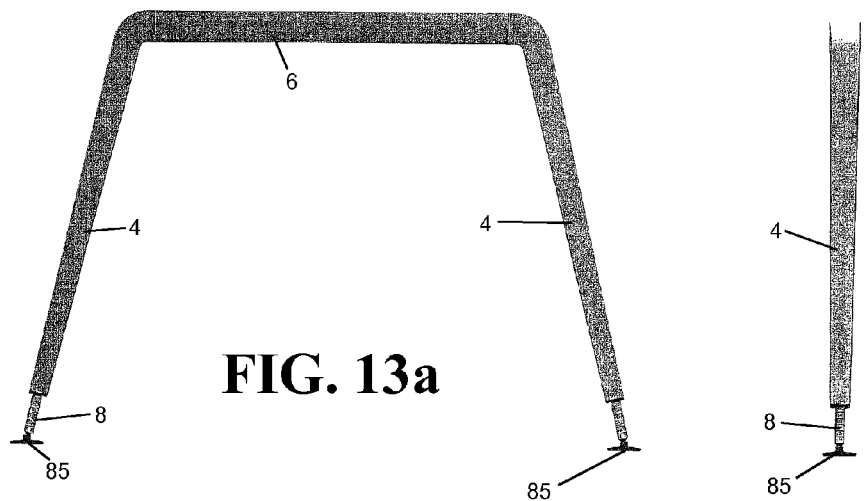

FIGS. 13a and 13b show slanted legs 4 that are equipped with height adjustment units 8. FIG. 13a shows the connections between two slanted legs with a cross brace 6. FIG. 13b is a front view of the assembly of FIG. 13a.

Figure 15:
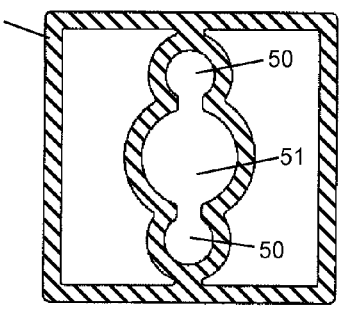
FIG. 15 shows two vertical leg cross sections.
Figure 16:
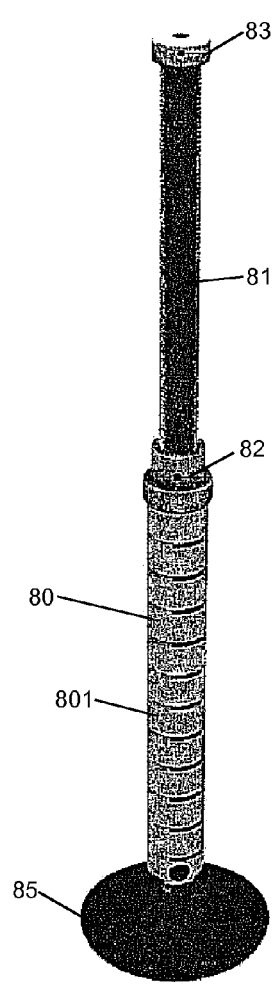
FIG. 16 illustrates a height adjustment mechanism for a table leg.

FIGS. 14a through 14d show various representations of a vertical leg 5 secured to a frame section 11 through a base unit. In the illustrated example, the vertical leg includes a receiving channel 50 for receiving the height adjustment unit. The vertical leg also includes screw channels 51 for receiving screws 60 from the base unit. FIG. 15 shows a cross section of the vertical leg 5, with the receiving channel 50 and the screw channels 51. FIG. 16 shows an isolated view of the height adjustment mechanism. The height adjustment mechanism includes a sliding guide 83 adapted to slide through the receiving channel of the vertical leg. The adjustment mechanism includes a threaded arm 81 configured to pass through a lower section 80. A stopper 82 near the top of the lower portion 80 is configured to interconnect with the vertical or slanted legs. The stopper 82 is firmly pressed against the receiving channel and acts to transmit the weight of the table to the floor. The height adjustment mechanism passes through a lower opening 86 of the table leg and a ball joint 84 is used to position the floor plate 85 at an orientation to match the floor surface.

Figure 17A:
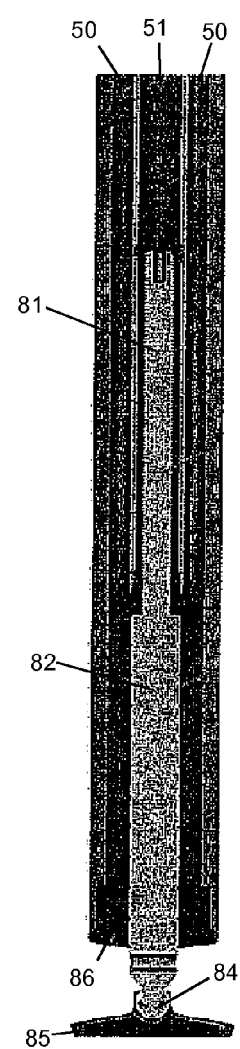
FIG. 17a shows a cutout view of a height adjustment mechanism within a table leg.
Figure 17B:
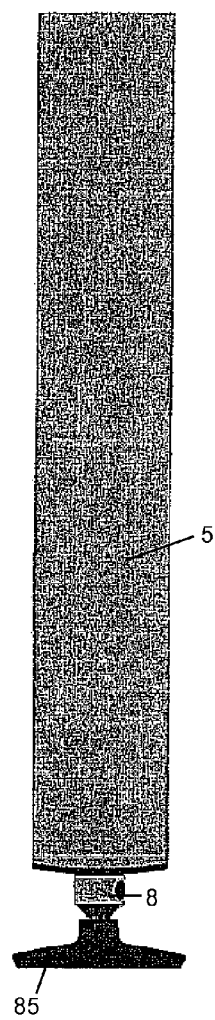
FIG. 17b illustrates a table leg enclosing a height adjustment mechanism.

FIGS. 18a, 18b, and 18c show a cross section of the slanted table leg 4 with a height adjustment mechanism 8 which is similar to the mechanism shown in FIGS. 16 and 17a.

FIGS. 18a, 18b, and 18c show a cross section of the slanted table leg 4 with a height adjustment mechanism 8 which is similar to the mechanism shown in FIGS. 16 and 17a.

Figure 19:
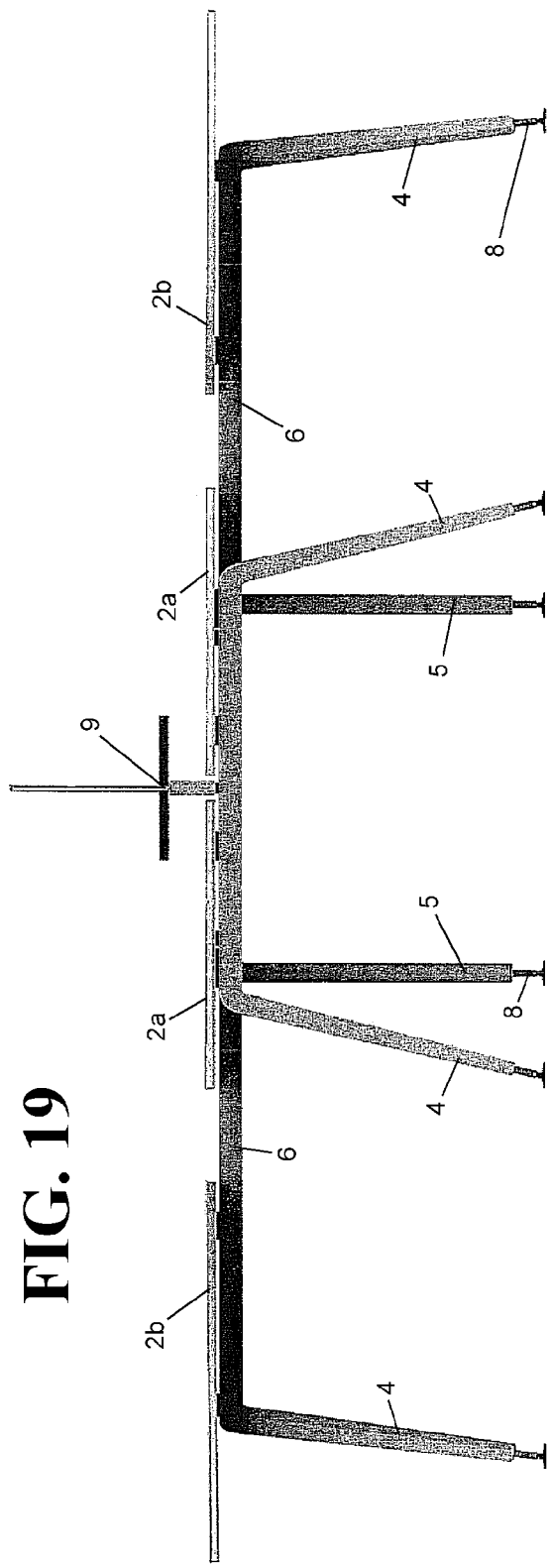
FIG. 19 is a side view of the desk system of FIG. 1.
Figure 20:
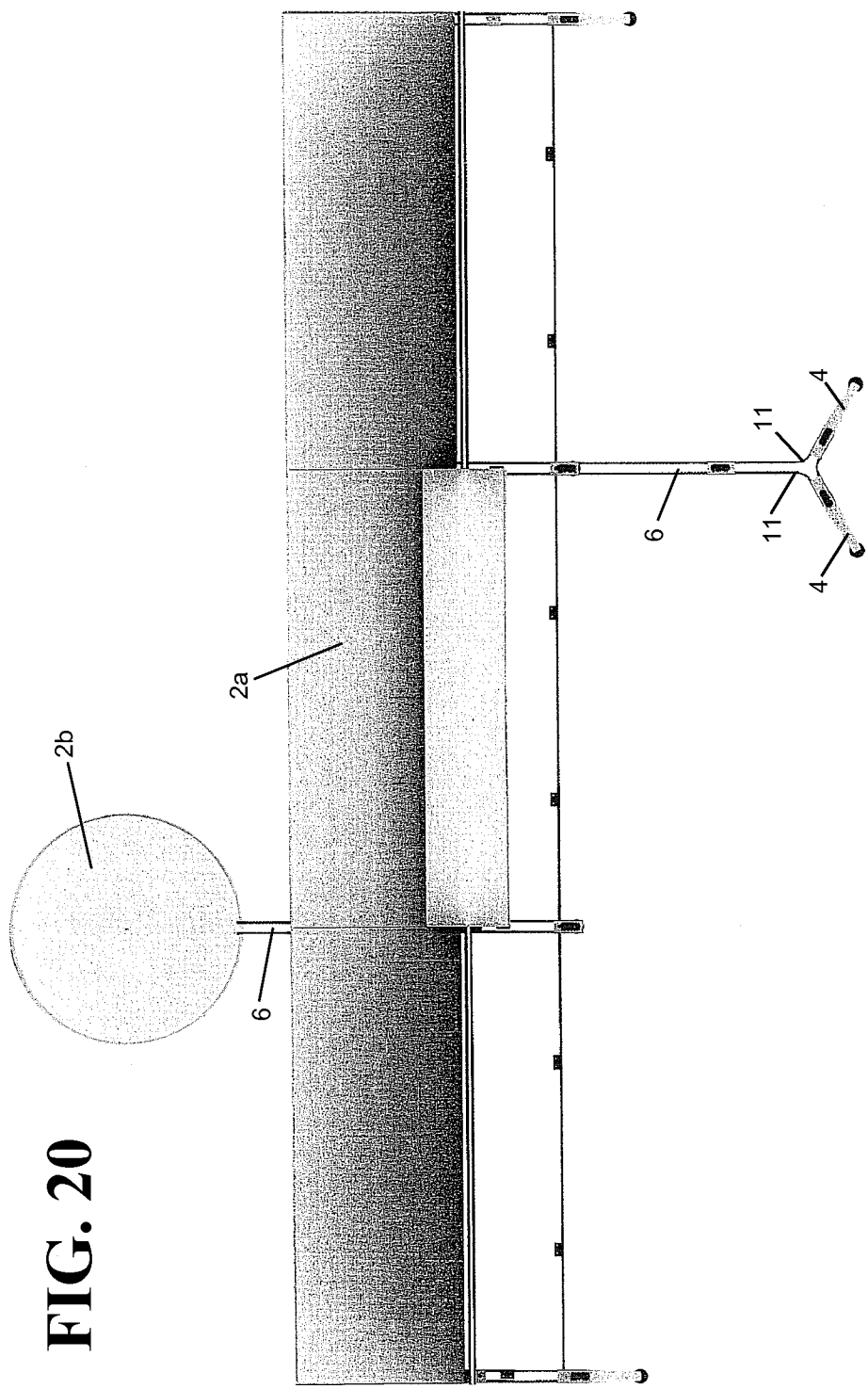
FIG. 20 is a top view of the desk system of FIG. 1.
Figure 21:
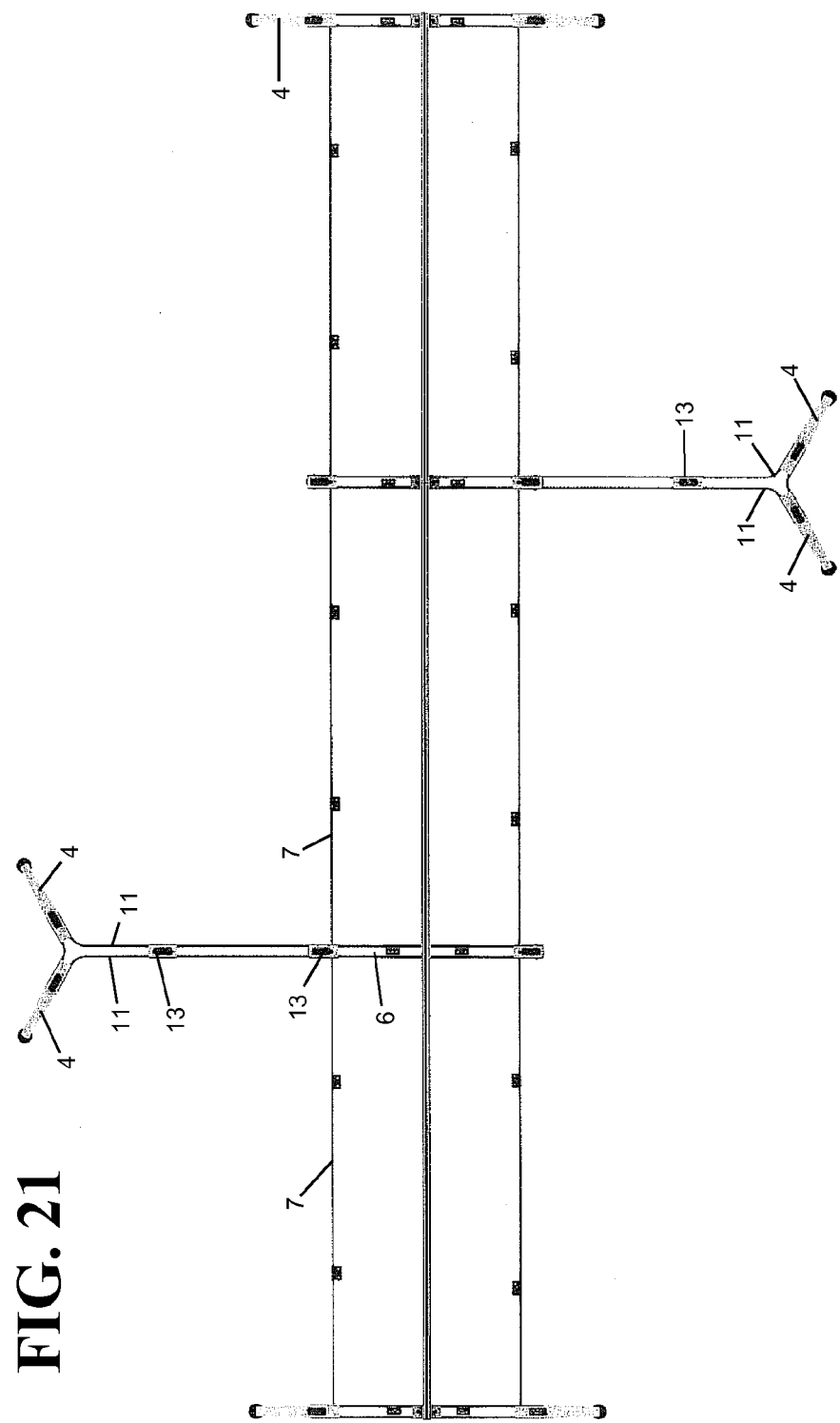
FIG. 21 is a top view of the desk system of FIG. 1 without the table tops.

FIG. 19 show a side view of the table system 1 of FIG. 1 with longitudinal struts 7 and cross braces 6 in a structured framework connected to slanted legs 4 and vertical legs 5. FIG. 20 shows the table system of FIG. 1 from a top view while FIG. 21 shows the table system of FIG. 1 without the tops. Under the round tops, two slanted legs having integrally formed clamping sections are arranged at 120° angles to each other. A frame section is bent at 120° to match the alignment of the legs and extend between the base units at the legs. Similarly, the individual frame sections may be bent at a plurality of angles to create various frame profiles such as a branched profile or a honeycomb profile.

Figure 22:
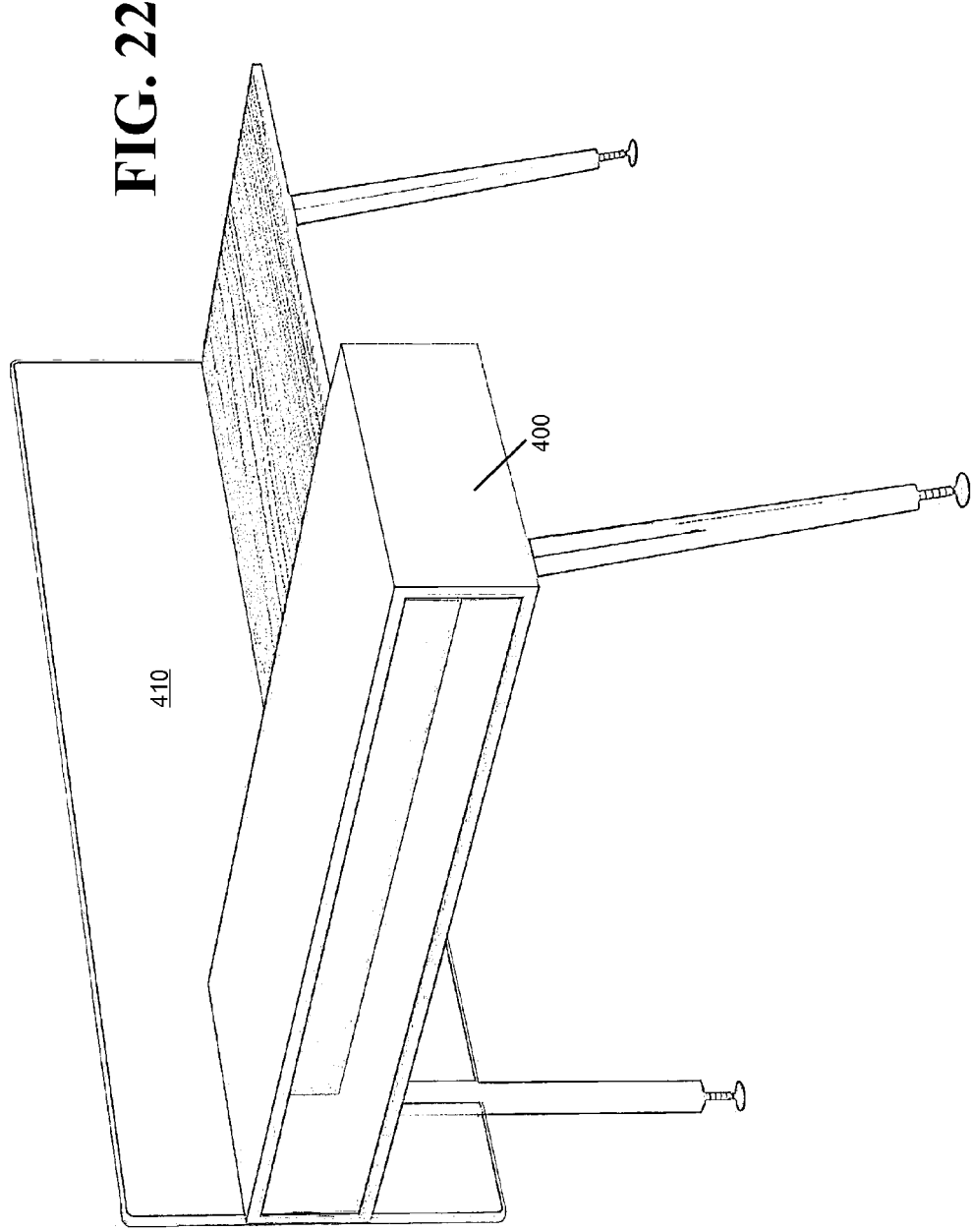
FIG. 22 is an upper perspective view of a table system with an integral storage compartment and a divider.
Figure 23:
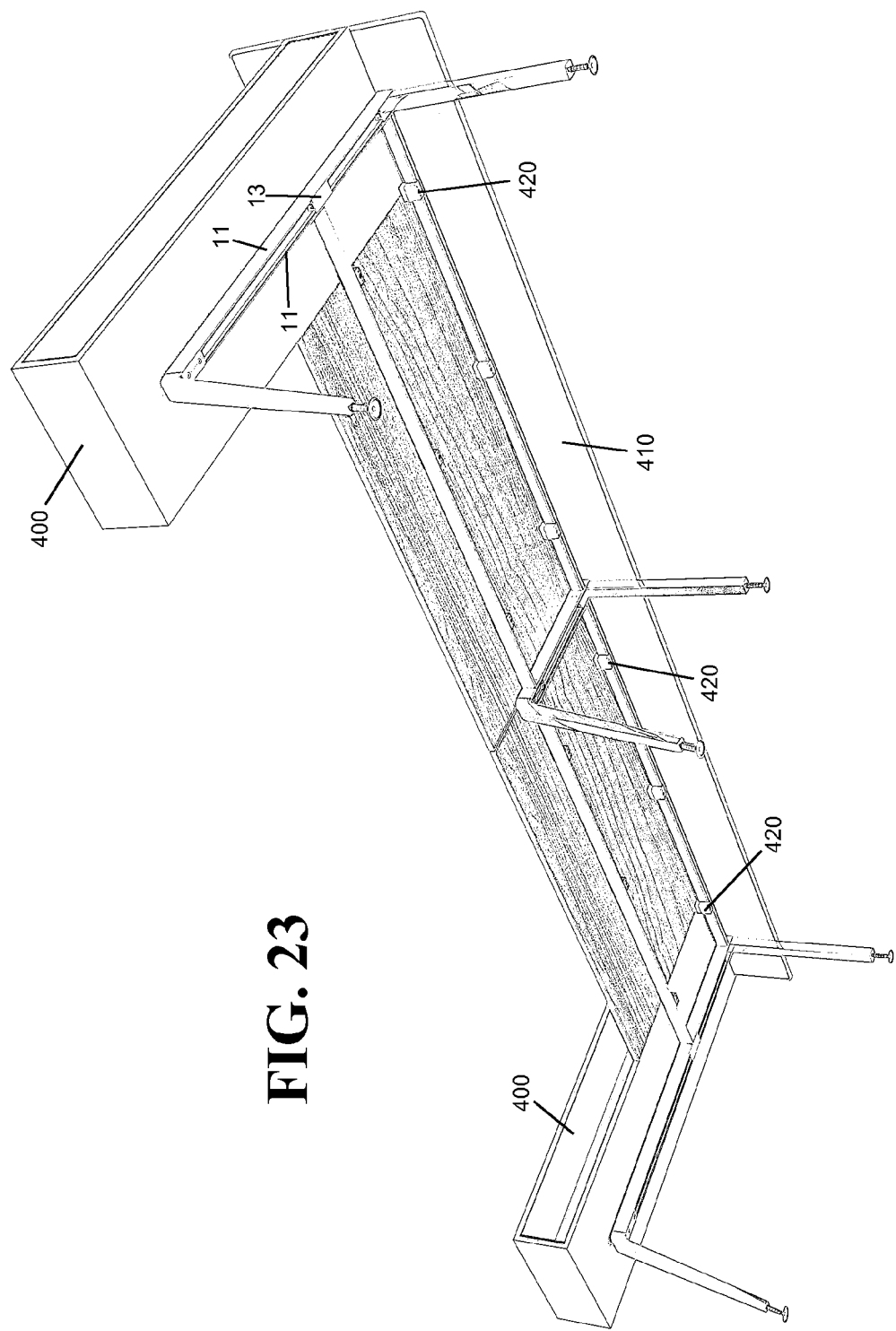
FIG. 23 is a lower perspective view of a table system with two storage compartments, a table top and a divider.

FIGS. 22 and 23 show perspective views of table systems with storage compartments 400 and dividers 410. The inclined table legs may include integrally formed apertures in their bent upper areas and integrally formed clamping sections for securing the storage compartments 400 to the table frame. A single clamping section 13, distant from a table leg, is positioned between two frame sections 11 to provide another point to secure the storage compartment to the table frame. The table top is supported by support structures 420 clamped onto the frame sections.

Figure 24:
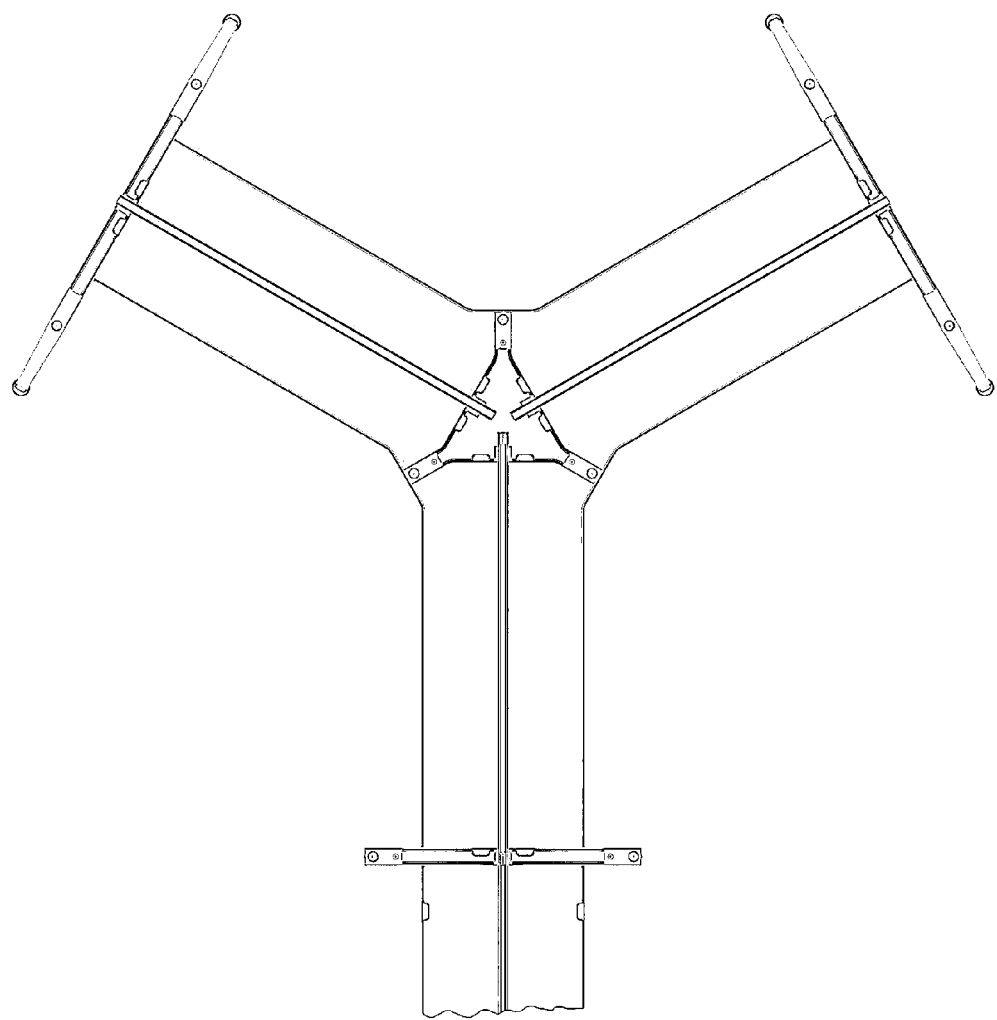
FIG. 24 is a top view of a table system with three sections intersecting at a central location.

FIG. 24 illustrates an example of a table system with multiple table tops connected at a triangular intersection. Having multiple table tops converge at a single location allows a single electrical and communication hub to serve multiple areas without extensive wiring.

Figure 25:
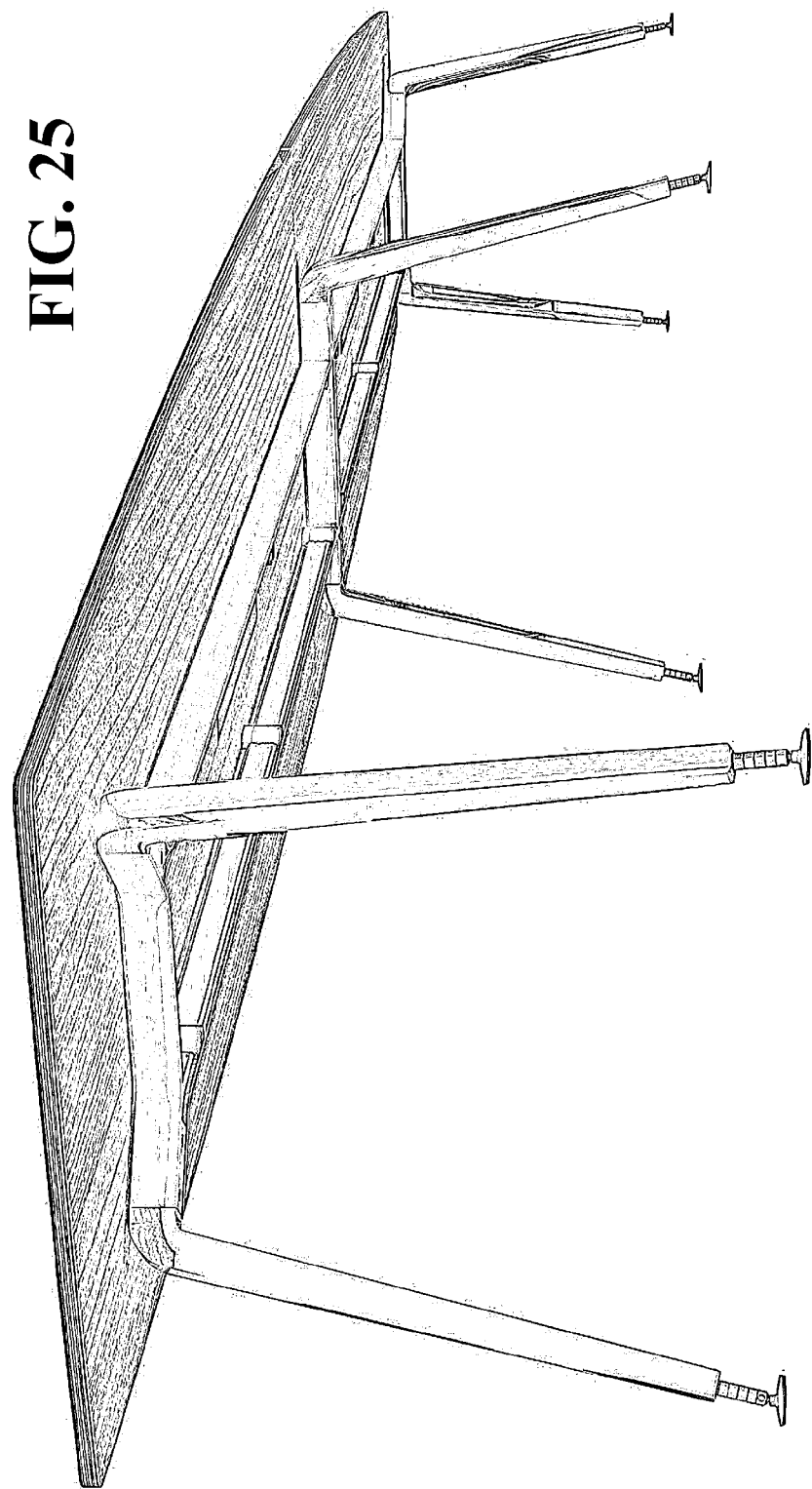
FIG. 25 is a lower perspective view of a table system having spacers attached to cross members for supporting the table top.

FIG. 25 illustrates an example of linear frame sections perpendicularly secured to bent frame sections. Multiple unique configurations and styles may be created by utilizing bent and linear frame sections in a single table frame.

Figure 26:
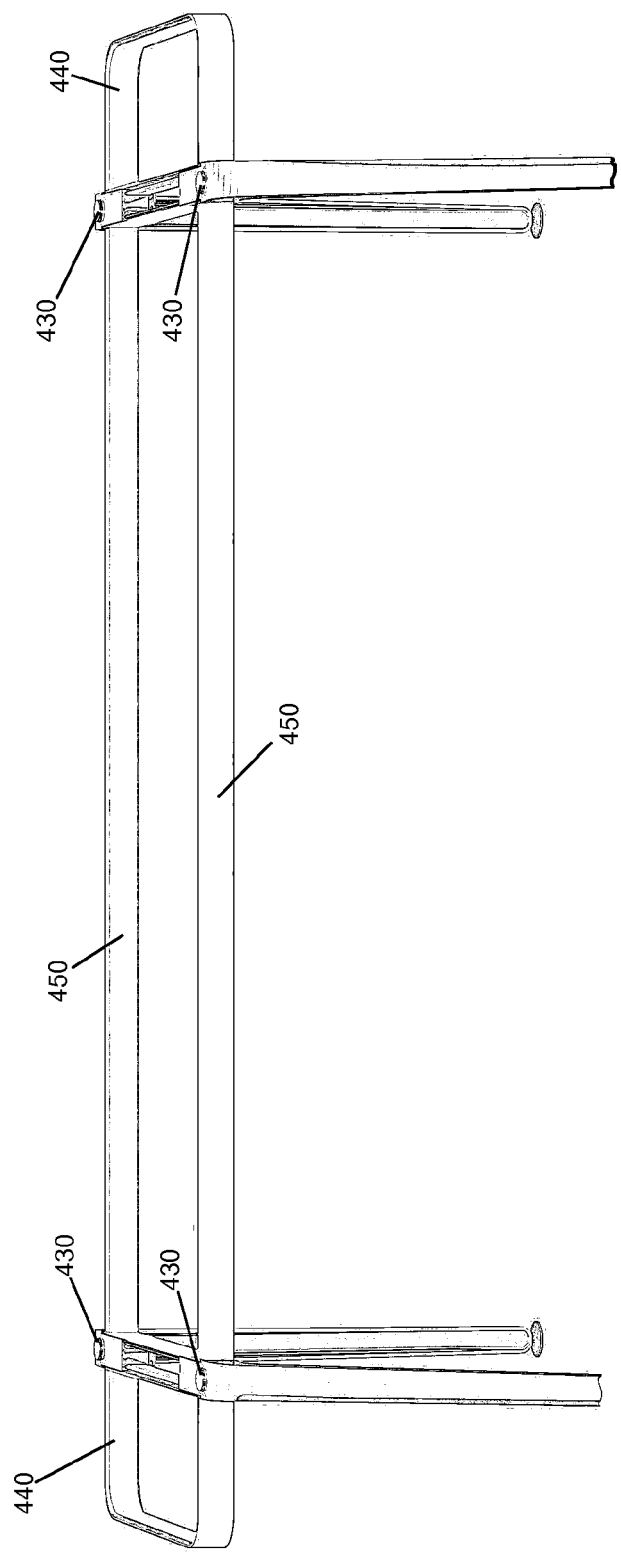
FIG. 26 is a perspective view of a table frame system having U-shaped braces and spacers integrally formed into the table legs for supporting a table top.

FIG. 26 shows a table frame having table legs with integrally formed supports 430 for supporting a table top. U-shaped frame structures 440 are perpendicularly secured to linear frame structures 450 extending between the table legs. The U-shaped frame structures provide for additional locations for a table top to be supported and may increase the maximum length of table that may be supported by only four legs.

Figure 27:
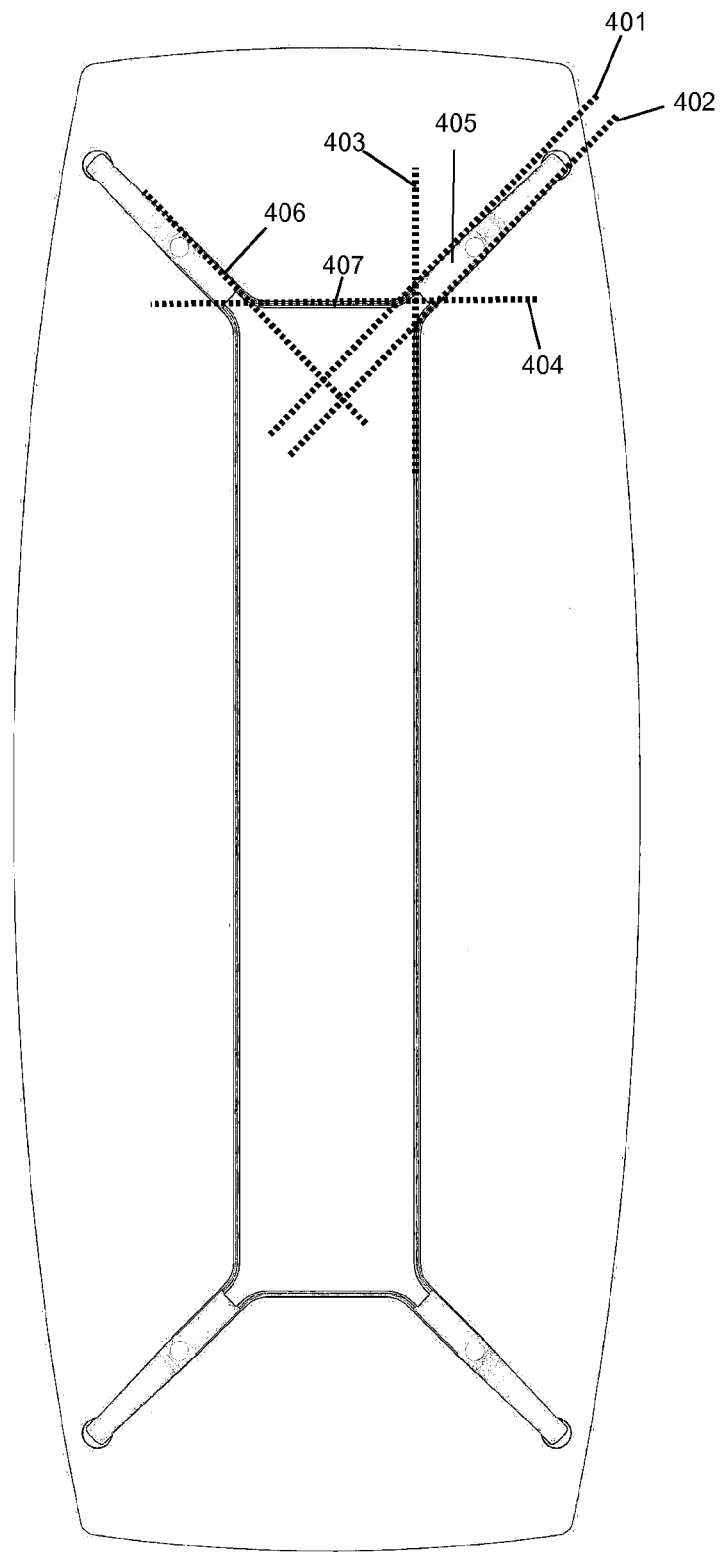
FIG. 27 is a top view of a table having four angled table legs and two bent frame sections extending from each table leg.
Figure 28:
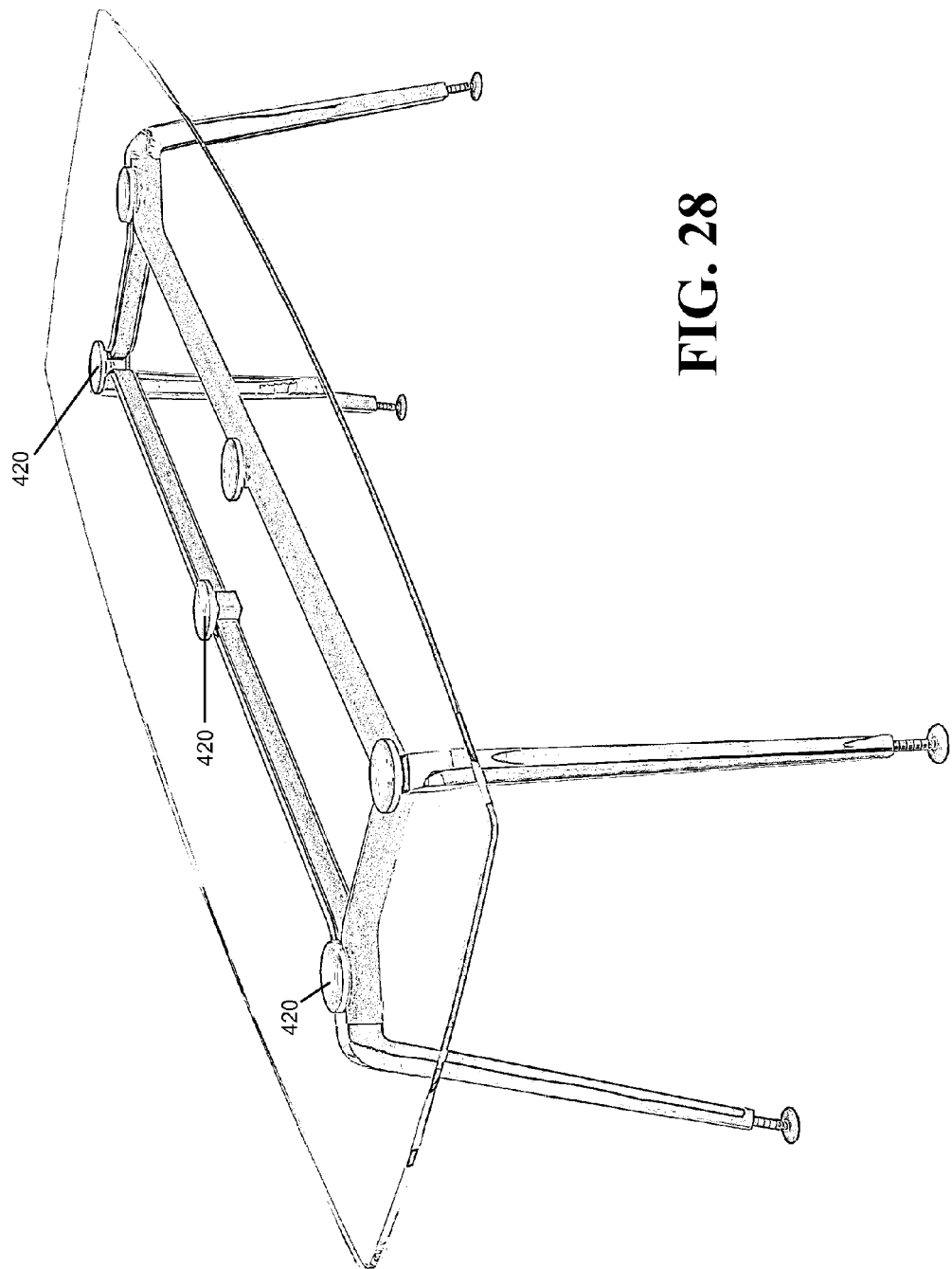
FIG. 28 is a perspective view of a table having four angled table legs, two bent frame sections extending from each table leg, and support structures connecting to the legs and frame sections for supporting the table top.

FIGS. 27 and 28 show tables with four bent frame structures secured to four inclined table legs. In FIG. 28 support structures 420 are secured to the table legs and the frame structures to support the weight of the table top. The tables of FIGS. 27 and 28 use a minimal number of frame sections to create a table with a refined appearance and a high degree of symmetry.

Figure 29:
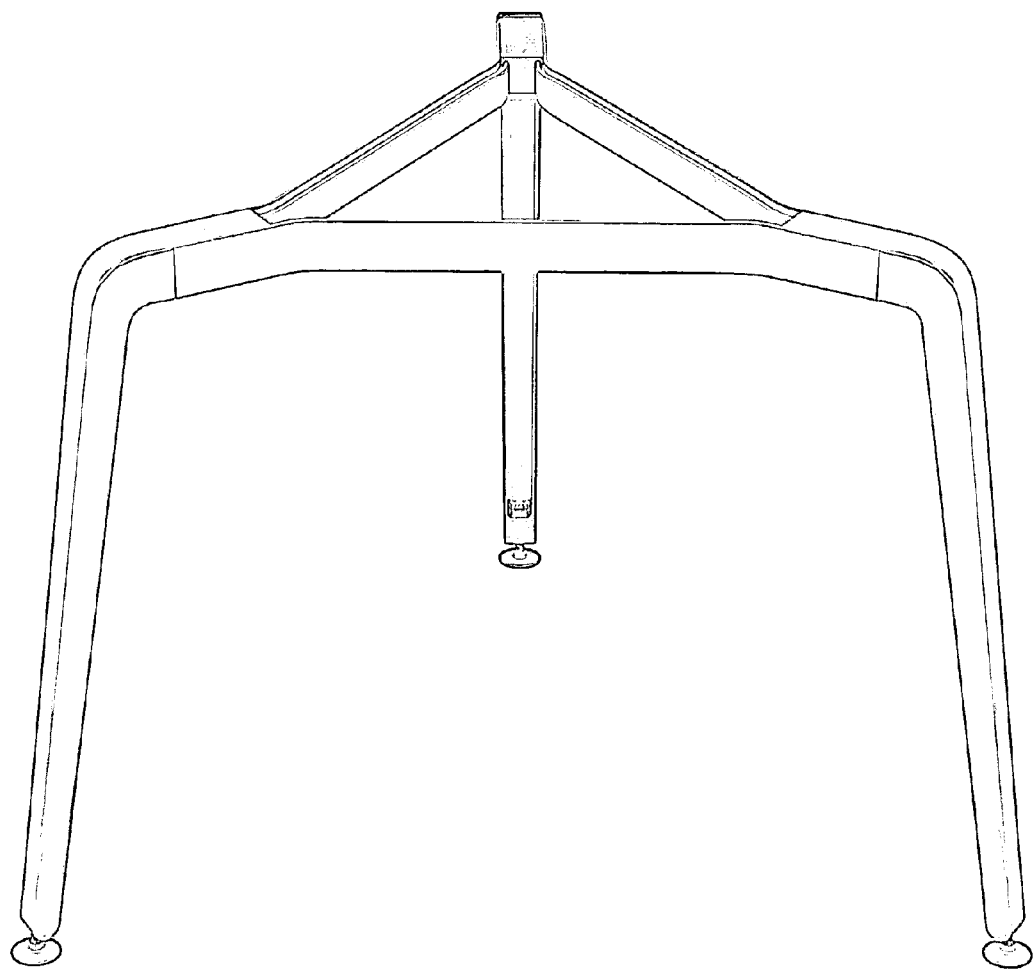
FIG. 29 is a perspective view of a table frame having three angled table legs and two bent frame sections extending from each table leg.

FIG. 29 shows a frame comprising three identical bent frame sections secured to three table legs. The frame may be used for a plurality of different applications such as for a stool, a coffee table, or to support a round table top. Although identical frame sections are shown in FIG. 29, other larger numbers of identical frame sections may be used to create circular frame structures.

Figure 30:
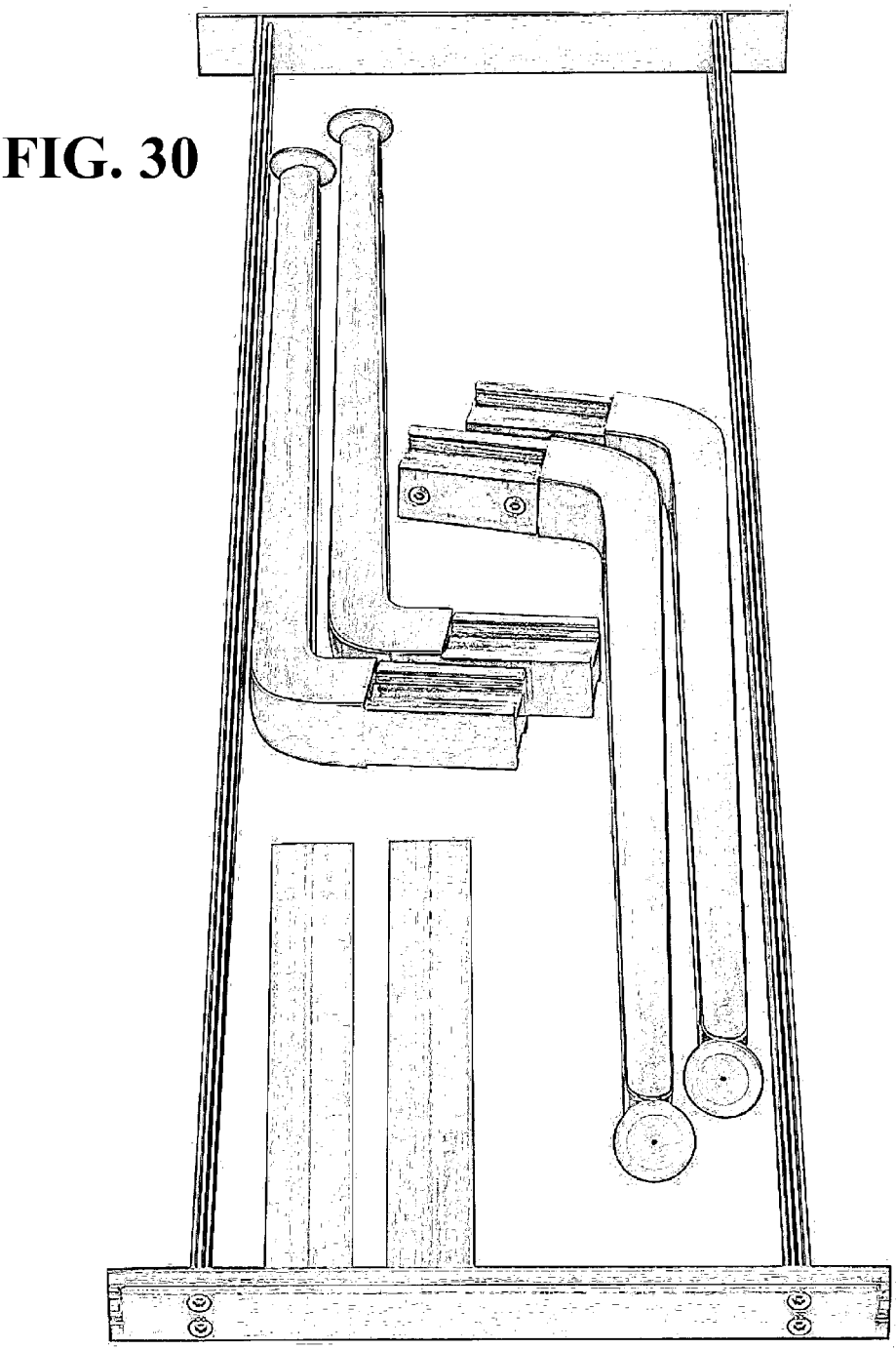
FIG. 30 is a perspective view of a disassembled table frame with four table legs and frame sections perpendicularly intersecting.
Figure 31:
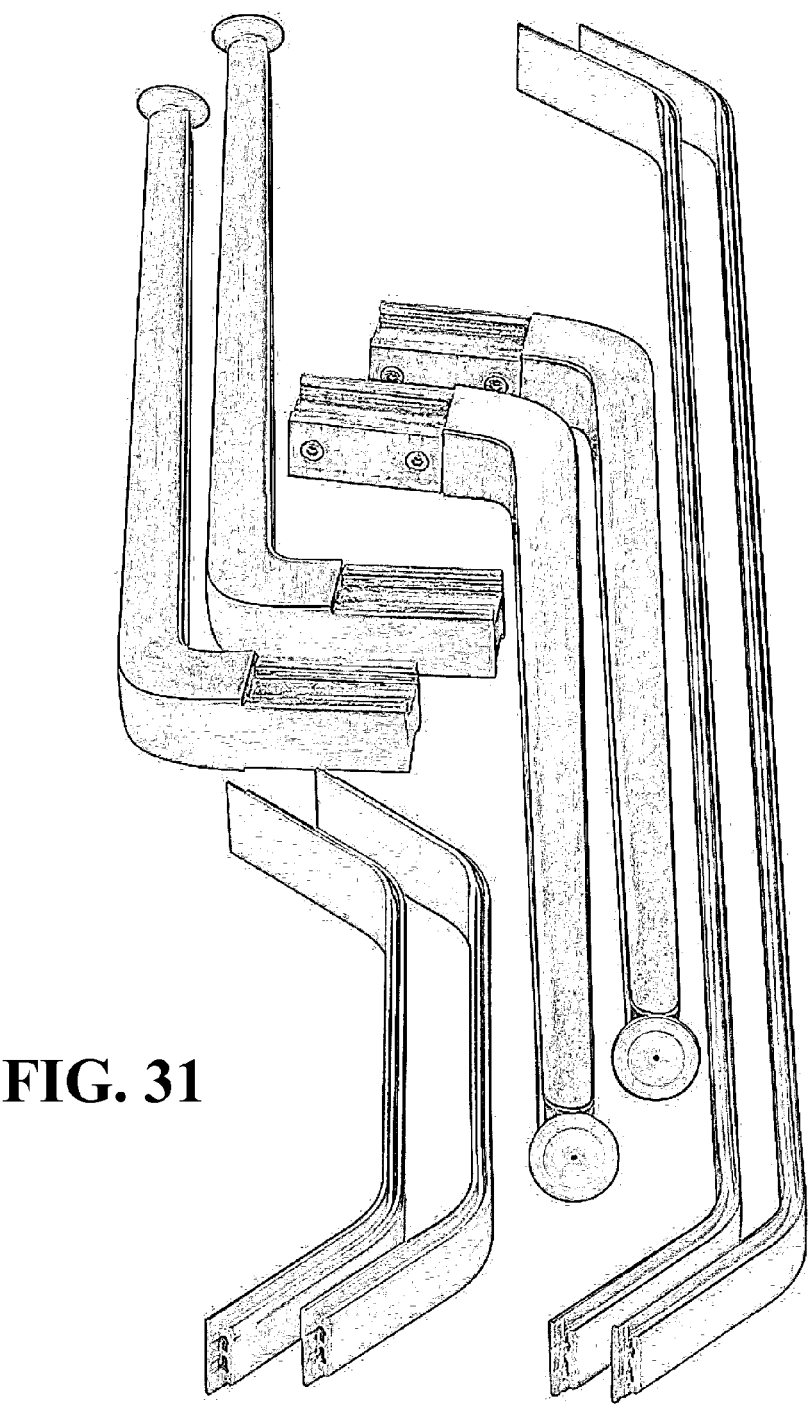
FIG. 31 is a perspective view of a disassembled table frame with four table legs and bent frame sections.

FIGS. 30 and 31 illustrate examples of disassembled frame structures with four inclined and linear frame sections or bent frame sections. The integrally formed clamping mechanisms in the table legs reduce the number of individual pieces required to complete a table frame and also reduce the amount of time needed to assemble the table frame. If the end user decides to disassemble the table frame, the integrally formed clamping mechanisms in the table legs reduce the likelihood that a piece of the table frame will be lost or misplaced while in table frame is in storage.

Figure 33:
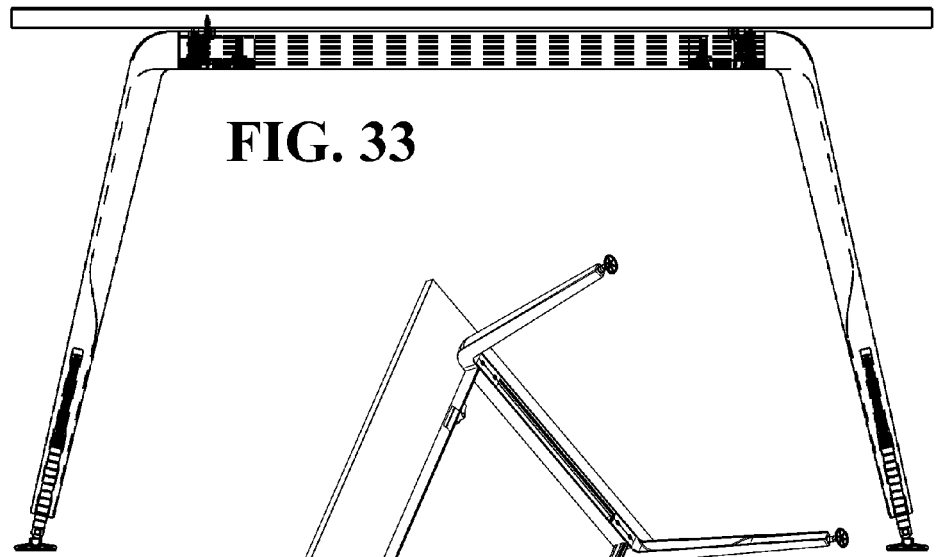
FIG. 33 is a side sectional view of the table system of FIG. 32.
Figure 32:
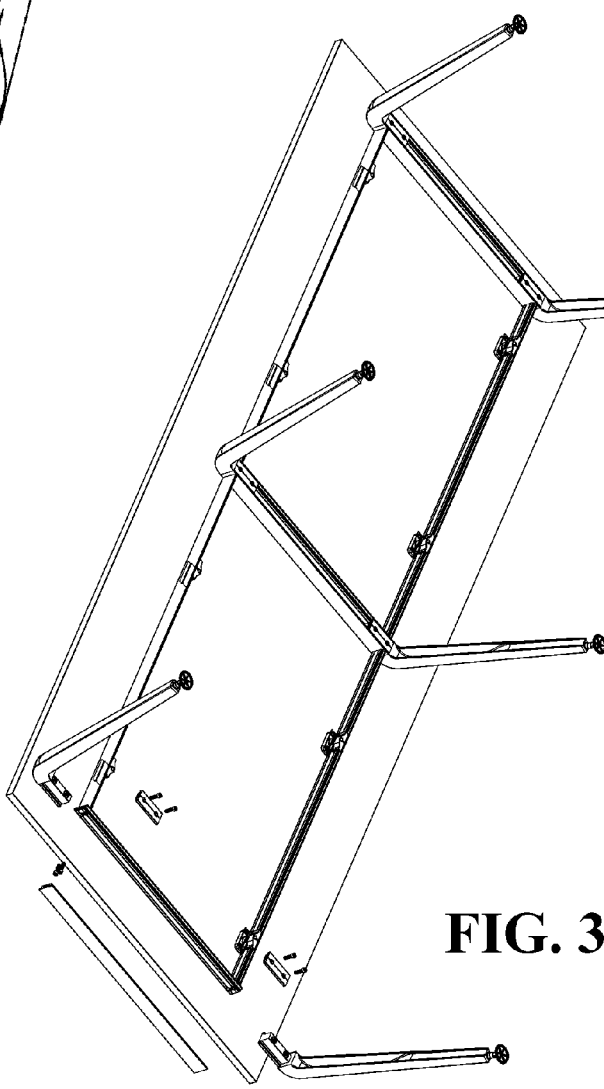
FIG. 32 is an underside perspective view of a table system with six table legs.
Figure 34:
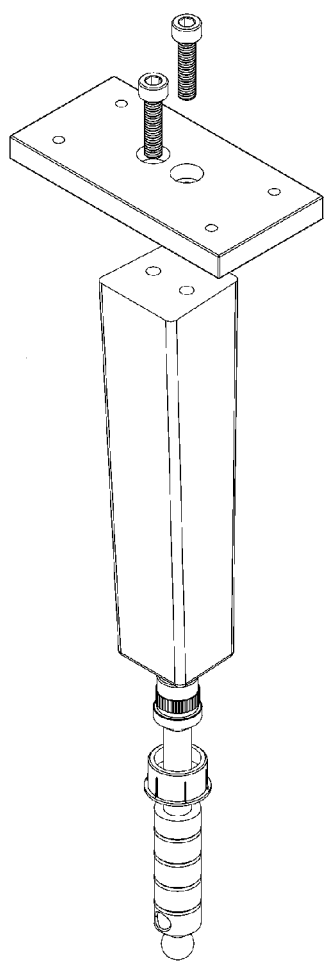
FIG. 34 is an exploded perspective view of the straight leg shown in FIG. 23.
Figure 35:
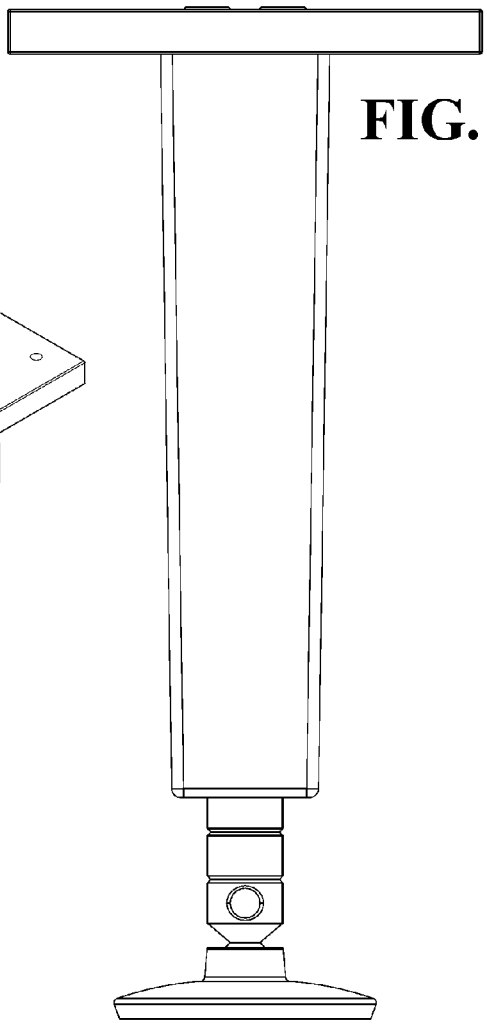
FIG. 35 is a side view of the intermediate support leg of FIG. 34.
Figure 36:
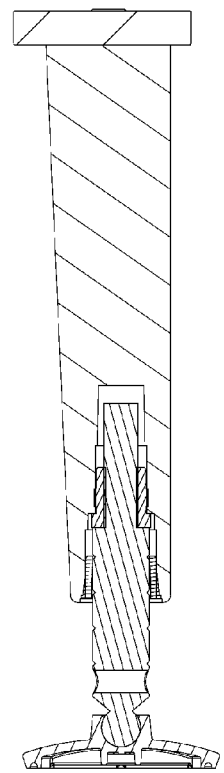
FIG. 36 is a cross sectional view of the intermediate support leg of FIG. 34.
Figure 37:
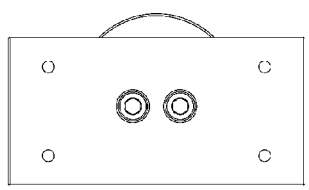
FIG. 37 is a top view of the intermediate support leg of FIG. 34.
Figure 38:
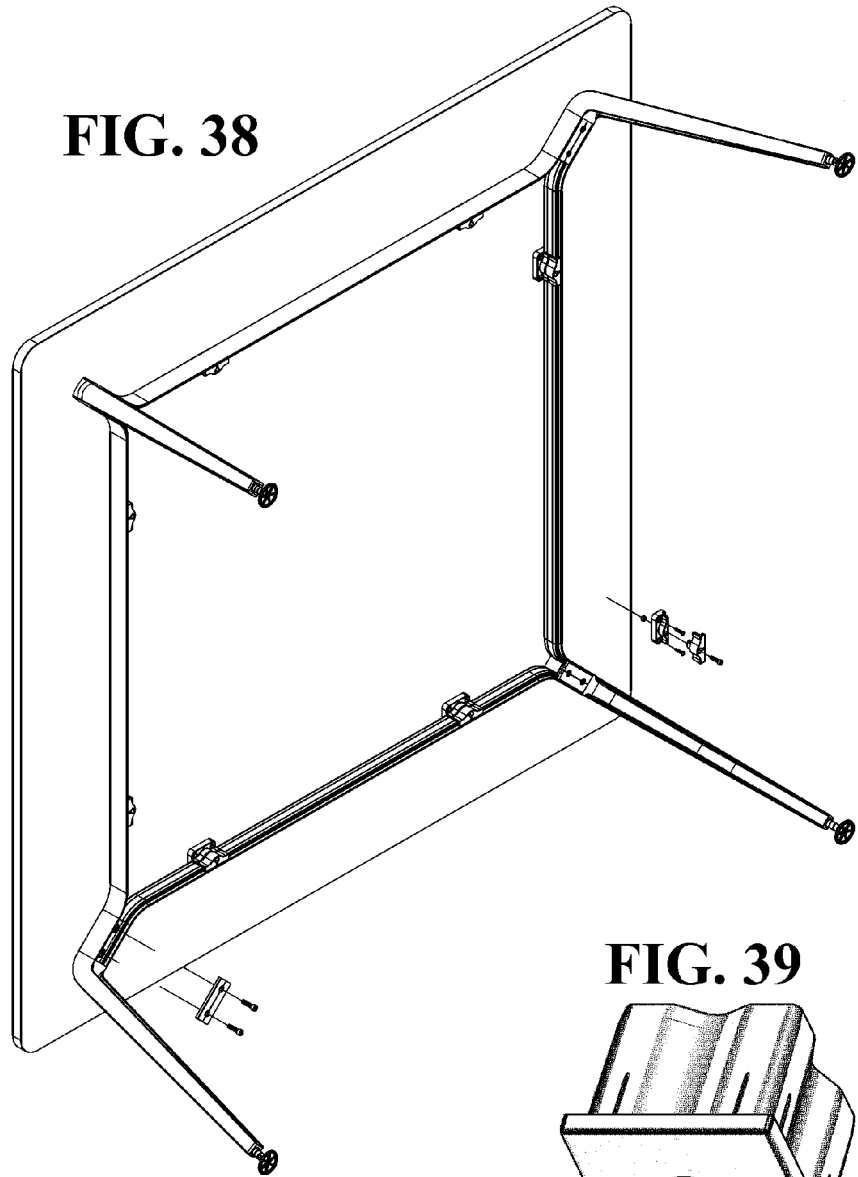
FIG. 38 is an underside perspective view of a table system with four table legs and support structures clamped to the table top.
Figure 39:
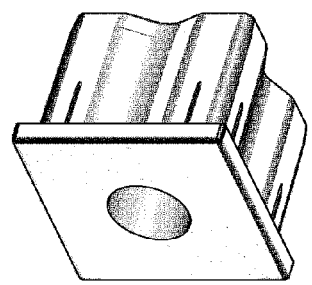
FIG. 39 is a perspective view of a straight leg end cap.
Figures 40, 41:
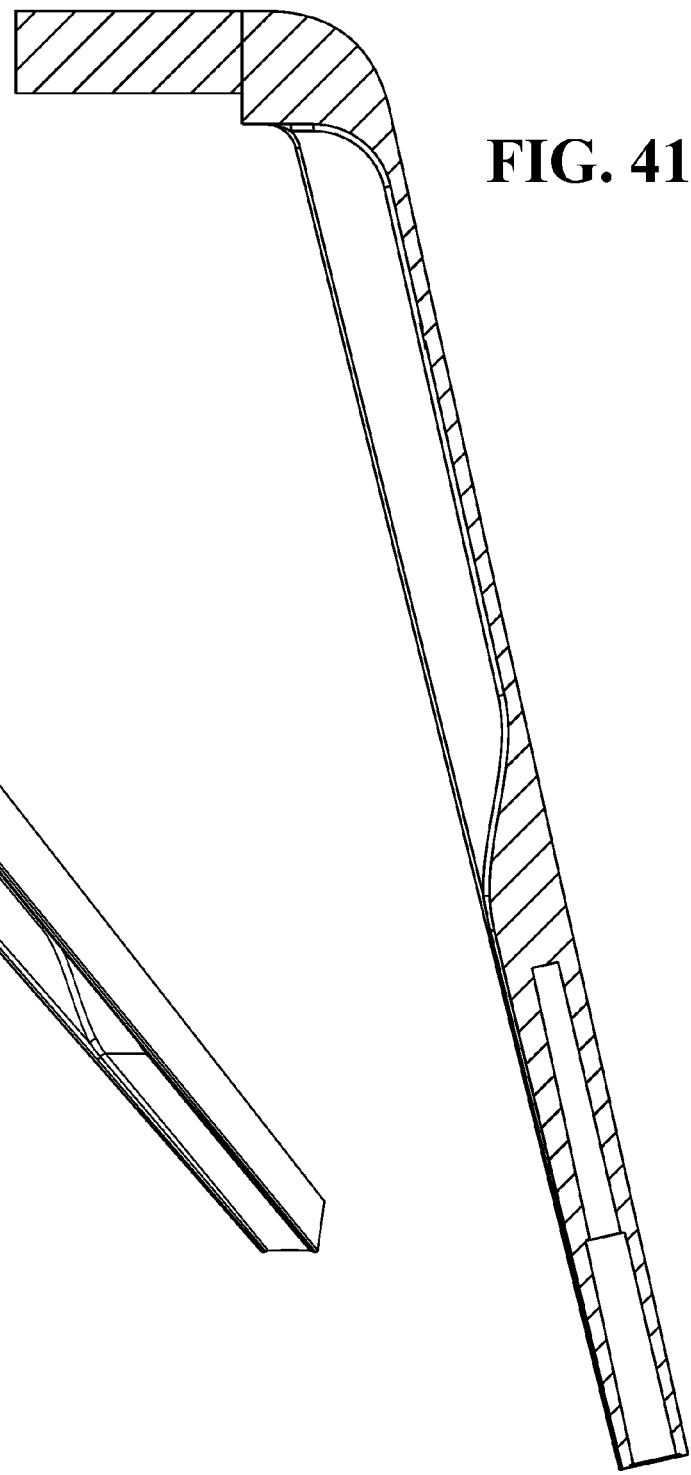
FIG. 40 is a perspective view of an inclined leg.
FIG. 41 is a side cross sectional view of an inclined leg.

FIGS. 32 and 33 illustrate inclined legs connecting to straight frame sections. FIGS. 34 through 37 illustrate straight table legs that may be incorporated into the table system. FIG. 38 shows a table system with inclined legs connecting to bent frame members. FIG. 39 shows an end cap for a straight leg. Inclined legs are shown in FIGS. 40 and 41.

Since a wide variety of table frame configurations may be constructed from the base pieces, significant savings may be realized by manufacturers who benefit from the economy of scale when producing large numbers of base pieces. Shipping and packaging costs may be reduced for manufacturers by shipping sets of base pieces (such as a set of 100 slanted table legs) to distributors or retail locations instead of shipping packages containing the pieces for a complete table frame. Additionally, the interchangeability of the base pieces reduces the number of replacement parts that must be kept by retailers and distributors in inventory.

Figure 42:
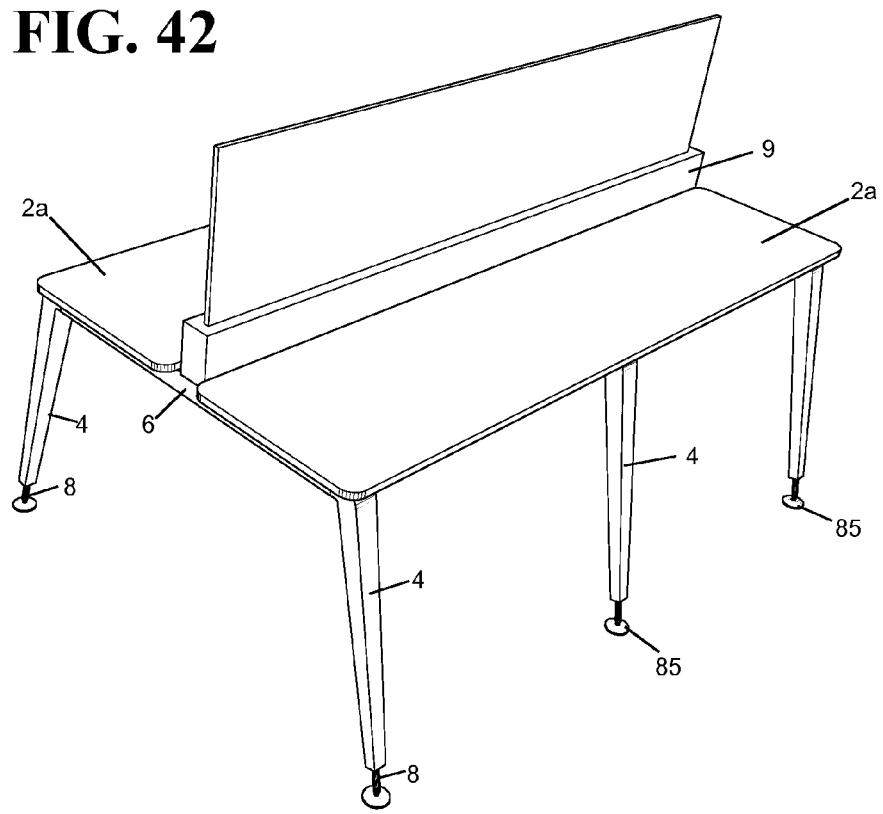
FIG. 42 is an upper perspective view of the table system shown in FIG. 3.
Figure 43:
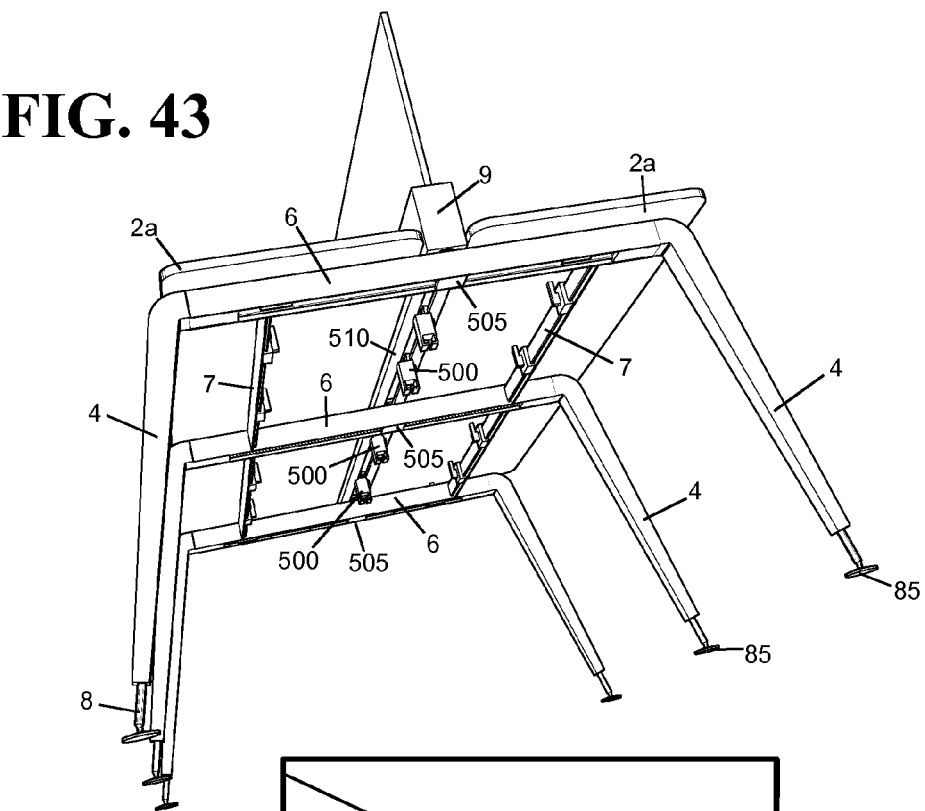
FIG. 43 is a lower perspective view of the table system shown in FIG. 3.
Figure 44:
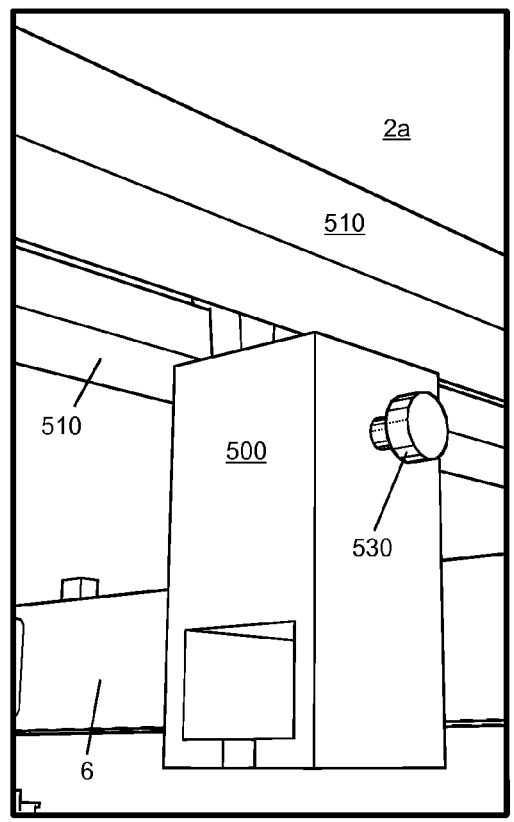
FIG. 44 is a close up view of a quick release component secured in a vertical construction of a table.

FIGS. 42 and 43 show upper and lower perspective views of a table system similar to that of FIG. 3. As shown in FIG. 43, there are a plurality of quick release mechanism 500 secured in the vertical construction 9. In addition to the quick release mechanisms being secured within the vertical construction, attachment devices 505 clamp to both the cross braces 6 and the vertical construction 9 to secure the vertical construction to table system. In the illustrated example, the vertical construction 9 has a substantially rectangular cross section with two lower bars 510 that the quick release mechanisms 500 and the attachment devices 505, interact with, and clamp onto.

Figure 45:
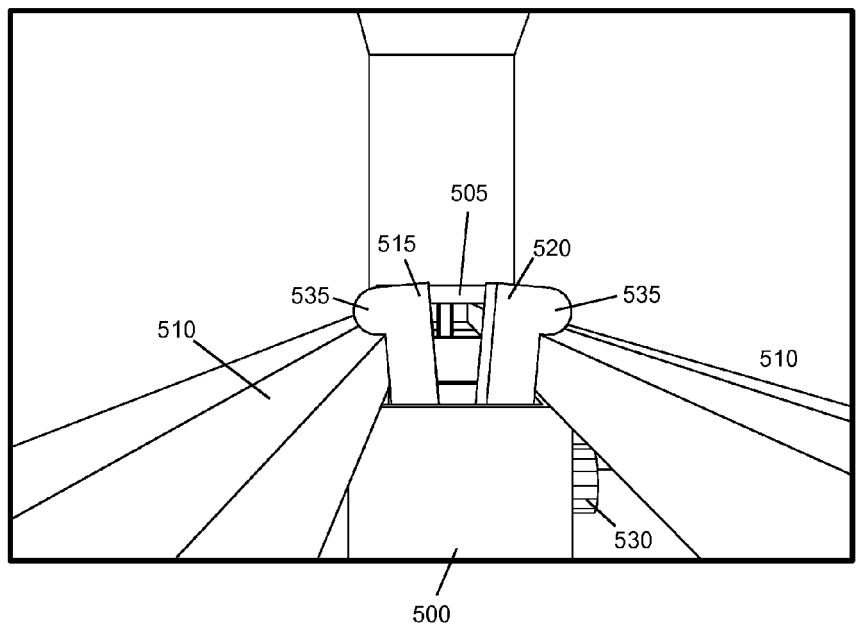
FIG. 45 is a side perspective view of the quick release component shown in FIG. 44.
Figure 46:
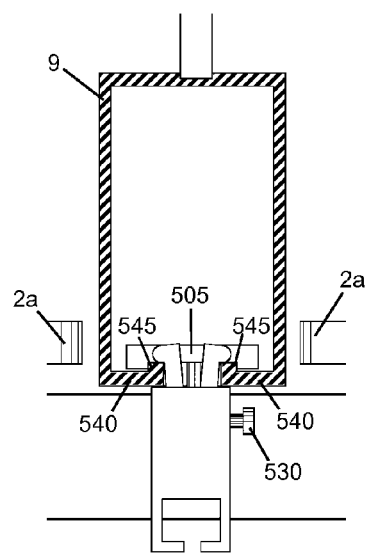
FIG. 46 is a cross sectional view of a vertical construction secured to a table with a quick release component secured in the vertical construction.

FIGS. 45 through 48 generally illustrate the various features of the quick release mechanisms 500; however the attachment device 505 can be seen interacting with the vertical structure 9 in FIGS. 45 and 46. The quick release mechanism 500 includes a first hinged clamp 515 pivotally secured to a second hinged clamp 520 at a rounded region 525. A screw 530 or other translational device presses against the first hinged clamp 515 and interacts with threads or other features on the second hinged clamp 520. The second hinged clamp includes a threaded aperture through which the screw passes. Rotation of the screw 530 causes the first and second hinged clamps to pivot away from each other. Each of the hinged clamps (515, 520) includes a protrusion 530 configured to interact with the lower bars 510 of the vertical structure 9. In the illustrated example, each of the lower bars 510 include a horizontal portion 540 and a vertical portion 545 that interact with the hinged clamps. The vertical portions each have an interior wall and the interior walls cooperate to substantially define (with the assistance of small end walls) a lower opening in the vertical construction. The protrusions 535 are separated from the walls of the box 540 by a first height 547 which is substantially similar to the height of the interior walls of the vertical portions 545.

Figure 47:
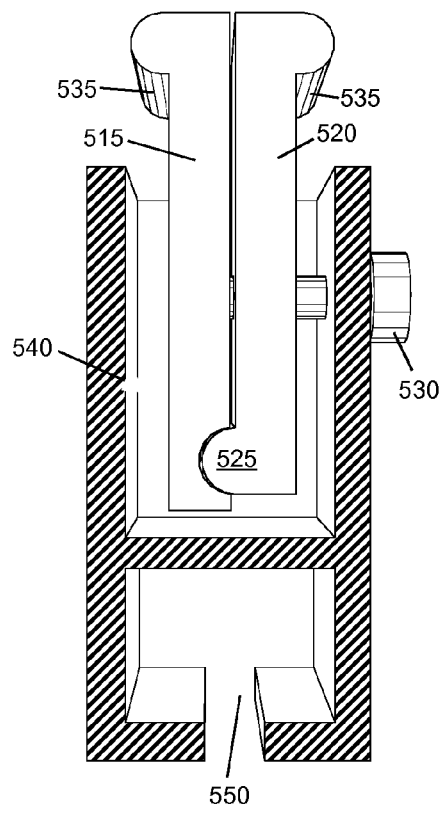
FIG. 47 is a side cross sectional view of a quick release component in a released configuration.
Figure 48:
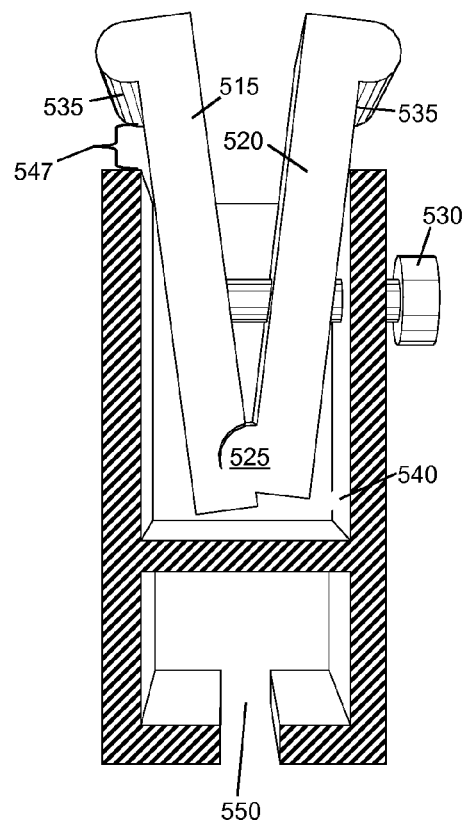
FIG. 48 is a side cross sectional view of a quick release component in a secured configuration.

The hinged clamps (515, 520) are generally secured within a four walled box of the quick release mechanisms. The screw 530 passes through one of the walls of the box 540 while the protrusions 535 are positioned a first distance 540 from the top of the walls. In an exemplary embodiment, the vertical portion of the lower bars has a height that is substantially equal to the first distance. It is generally expected that the screw will pass through the wall of the box without substantially interacting with the wall since the aperture in the wall will be without threads. In the illustrated example, the volume of the box is not substantially greater than the volume occupied by the hinged clamps. By having the clamps tightly fit within the box, the first hinged clamp 515 may be secured in the box by only the rounded region 525 and the area that is pressed upon by the screw 530. As shown in FIG. 47, the first hinged clamp 515 is separated from the walls of the box by a distance that is less than the radius of curvature of the rounded region 525 so even if the two hinged clamps are not tightly interacting at the rounded region the first hinge clamp 515 will not be able to be withdrawn from the box while the second hinged clamp 520 is secured in the box by the screw 530. The rounded region 525 is formed by a concave region in a first one of the hinged clamps and a convex region in a second one of the hinged clamps. The concave and convex regions interact with each other to form a hinge.

Below the box 540 with the hinged clamps (515, 520) is a functional region 550 that may take a variety of forms and is utilized for installing items below the table. In the illustrated example, the functional region 550 has a C-shaped cable raceway and is specifically adapted to be used in running cables (electrical, computer, phone, etc.) underneath the table. In another embodiment, the functional region may be in the form of a modesty panel underneath the table. FIGS. 24 through 32 of U.S. Pat. No. 8,578,864 entitled "Removable attachment bar for a flip-top table" illustrate various forms of the functional region. The contents of U.S. Pat. No. 8,578,864 are herein incorporated by reference.

FIGS. 49 through 53, illustrate a table top that is configured to be secured to, and slide along, frame sections 11 of the table. C-shaped clamps 600 wrap around the protrusions 118 of the frame sections 11. In one embodiment, the C-shaped clamps 600 are made of a plastic and snuggly fit around the protrusions 118 of the frame sections. By tightly fitting the protrusions, the movement of the table top 2a is limited, but not completely eliminated, thus allowing the table top to be slid from one area to another. While C-shaped clamps made of plastic are exemplary, other materials such as metal or wood may be used. From the C-shaped clamps 600 extend upward columns 605 to secure the table top 2a to the C-shaped clamp 600. In the illustrated examples, the upward columns are shown as having a solid, single piece construction; however it should be appreciated that the upward columns 605 may include a variety of other features. In one embodiment, the upward columns include vertically adjustable components (such as screws) that allow the elevation of the table top to be adjusted based on the user's preferences. Additionally, the upward columns may include hinges that are used to secure the table top to the rest of the upward column. By including hinges, the table top may be changed from a horizontally flat surface to one that has a substantial angle, such as would be found on a draftsman's table.

In the illustrated examples, the C-shaped clamps are also shown as being constructed from a single solid piece, however in an alternate embodiment the C-shaped clamps are constructed from two pieces that are vertically moveable relative to each other such that the user of the table may adjust the amount of force needed to slide the table from one area to another. In the embodiment where the C-shaped clamps are constructed from a single piece of material, the C-shaped clamps are slid onto the frame sections at the ends of the frame sections when the frame sections are not secured to table leg clamping sections. In the embodiment where the C-shaped clamps are constructed from two or more pieces, the clamps may be secured to the frame sections while the frames are secured to the table legs.

In yet another embodiment, the C-shaped clamps include horizontal screws that horizontally pass through the C-shaped clamps and are configured to engage with the first flat side 112 of the frame sections. In yet another embodiment, divots 610 have been milled into the first flat side 112 and the screws that pass through the C-shaped clamps are securable within the divots 610.

Figure 49:
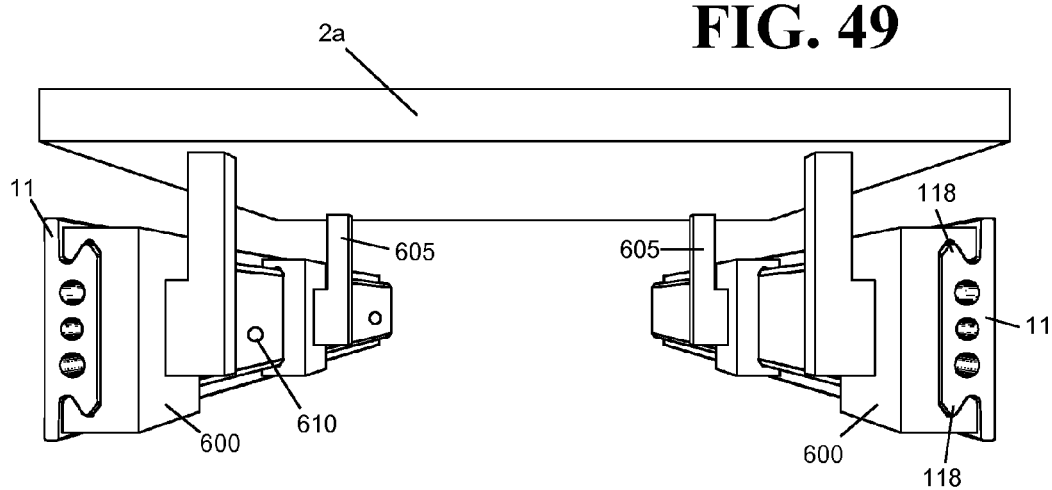
FIG. 49 is a side perspective view of a sliding top secured to frame sections.
Figure 50:
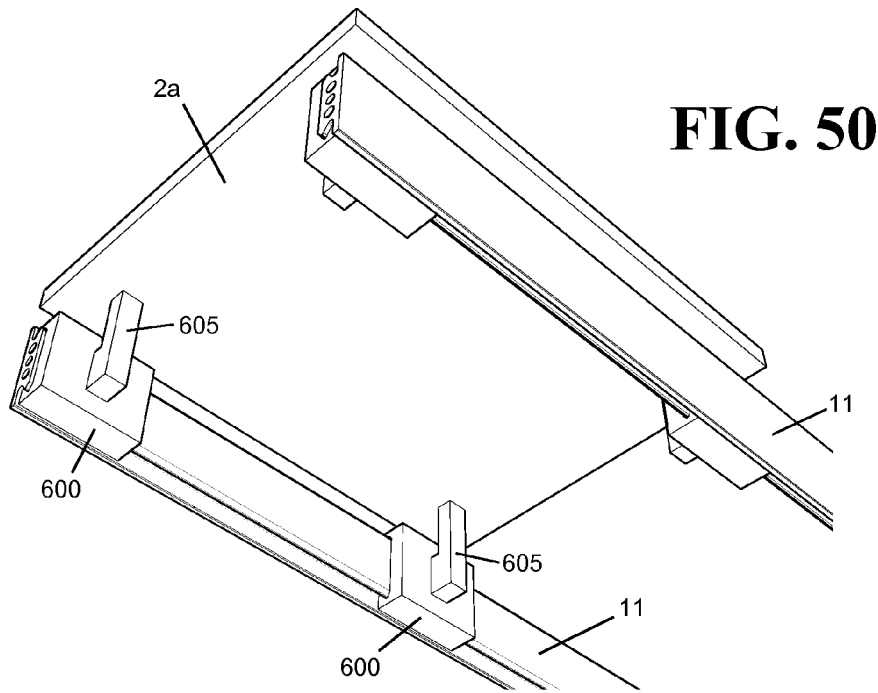
FIG. 50 is a lower perspective view of a sliding top secured to frame sections.
Figure 51:
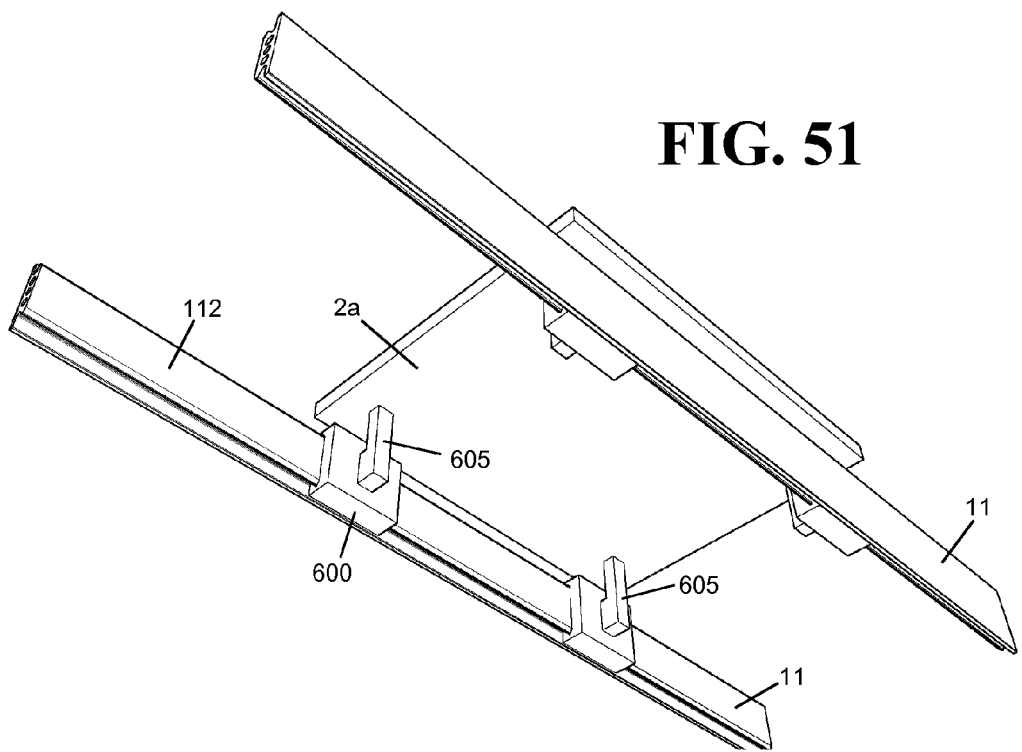
FIG. 51 is a second lower perspective view of a sliding top that has been slid to a second location.
Figure 52:
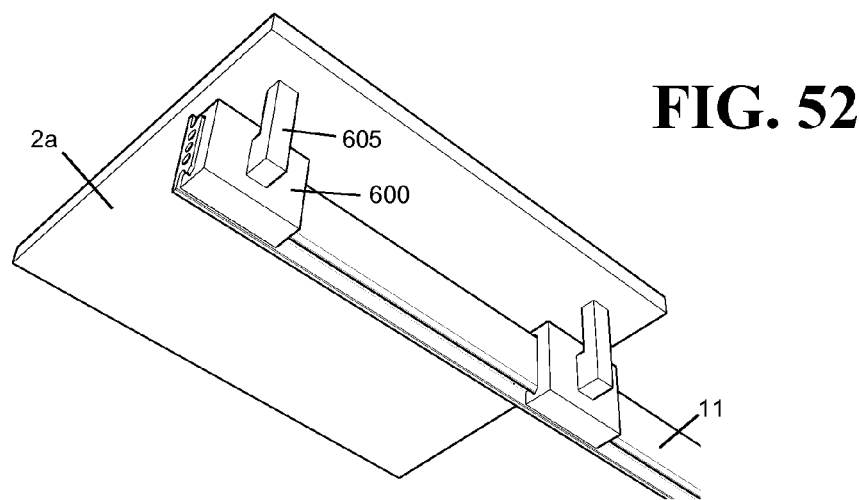
FIG. 52 is a lower perspective view of a sliding table top surface that is secured to a single frame section.
Figure 53:
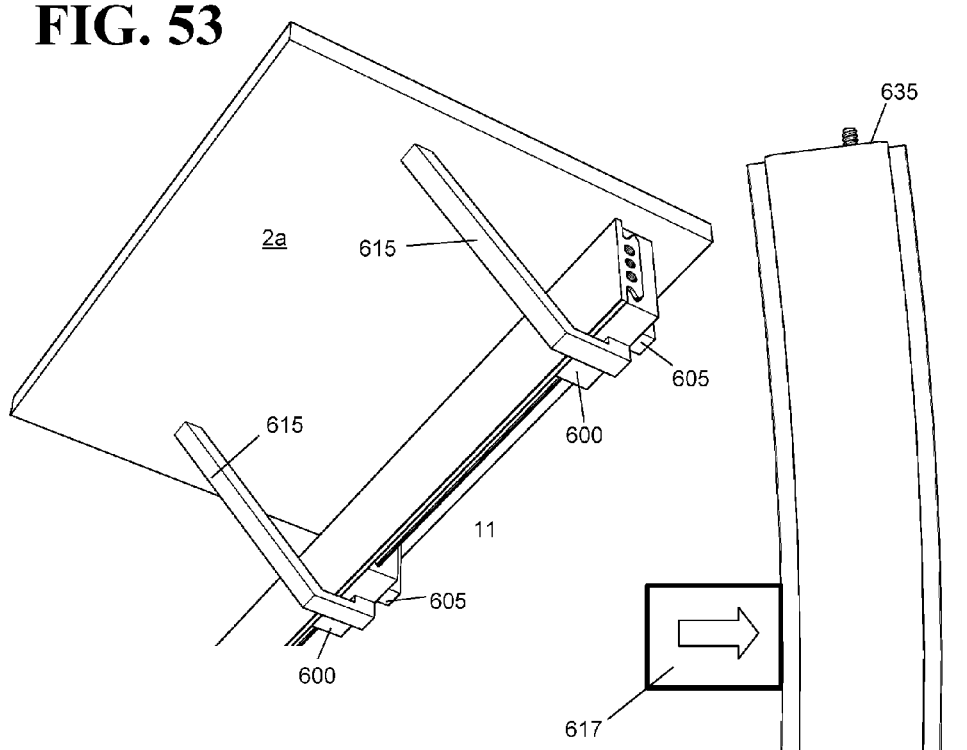
FIG. 53 is a lower perspective view of a sliding top that includes supports that wrap around a frame section.

FIGS. 49 through 51 show a slidable table top secured to two frame sections while FIGS. 52 and 53 illustrate a slidable table top secured to a single frame section. By securing the table top to more than one frame, larger and heavier table tops may be utilized, however smaller table tops may be supported by a single frame section. In FIG. 52 the C-shaped clamps 600 and upward columns 605 are substantially similar to those described with respect to FIGS. 49 through 51, however since the table top provides a large amount of leverage to act upon the clamp and column it is expected that the clamp and column will be constructed from metal or other highly resilient material capable of withstanding large forces. When the C-shaped clamp is constructed of metal, a layer of plastic or other coating may be applied to the clamp to help prevent the clamp from scratching or scuffing the frame section when the clamp slides along the frame section.

FIG. 53 illustrates a sliding table top supported by a single frame section where both upward columns 605 and wrapping columns 615 extend from the C-shaped clamps 600 to the table top surface. The wrapping columns 615 extend from the bottom of the C-shaped clamps and wrap around the frame sections 11 to portions of the table top distant from the frame section 11.

Figure 54:
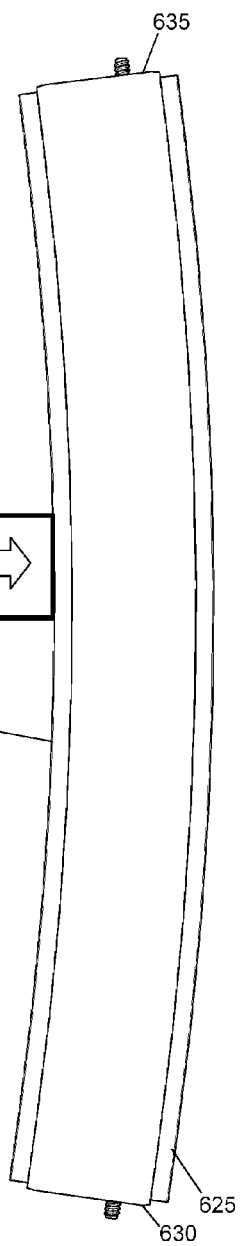
FIG. 54 is a side view of a frame section equipped with a tensioning system for reducing frame sagging.

FIGS. 54 through 57 illustrate a frame section tensioning system that counteracts sagging of the frame. FIG. 54 shows an exaggerated example of a frame section that is sagging due to supporting a heavy load 617. The top 620 of the frame section has been stretched by the heavy load while the bottom 625 of the frame section has been stretched a bit more than the top 620. Due to the shape of the frame section 11, the bottom 625 is caused to stretch more than the top 620 when a load is applied to the frame section. In order to counter act the stretching (and the sagging that causes the stretching) a tensioning system is utilized to pull the first end bottom 630 towards the second end bottom 635 of the frame section. Placing the tensioning system in the upper portion of the frame section 11 would exaggerate the sag while placing the tensioning system in the lower portion helps to counteract the sag. Since the amount of stretching of the frame is elevationally dependent, the tensioning system is preferably placed as low in the frame section as possible to maximize the anti-sagging properties.

Figure 55:
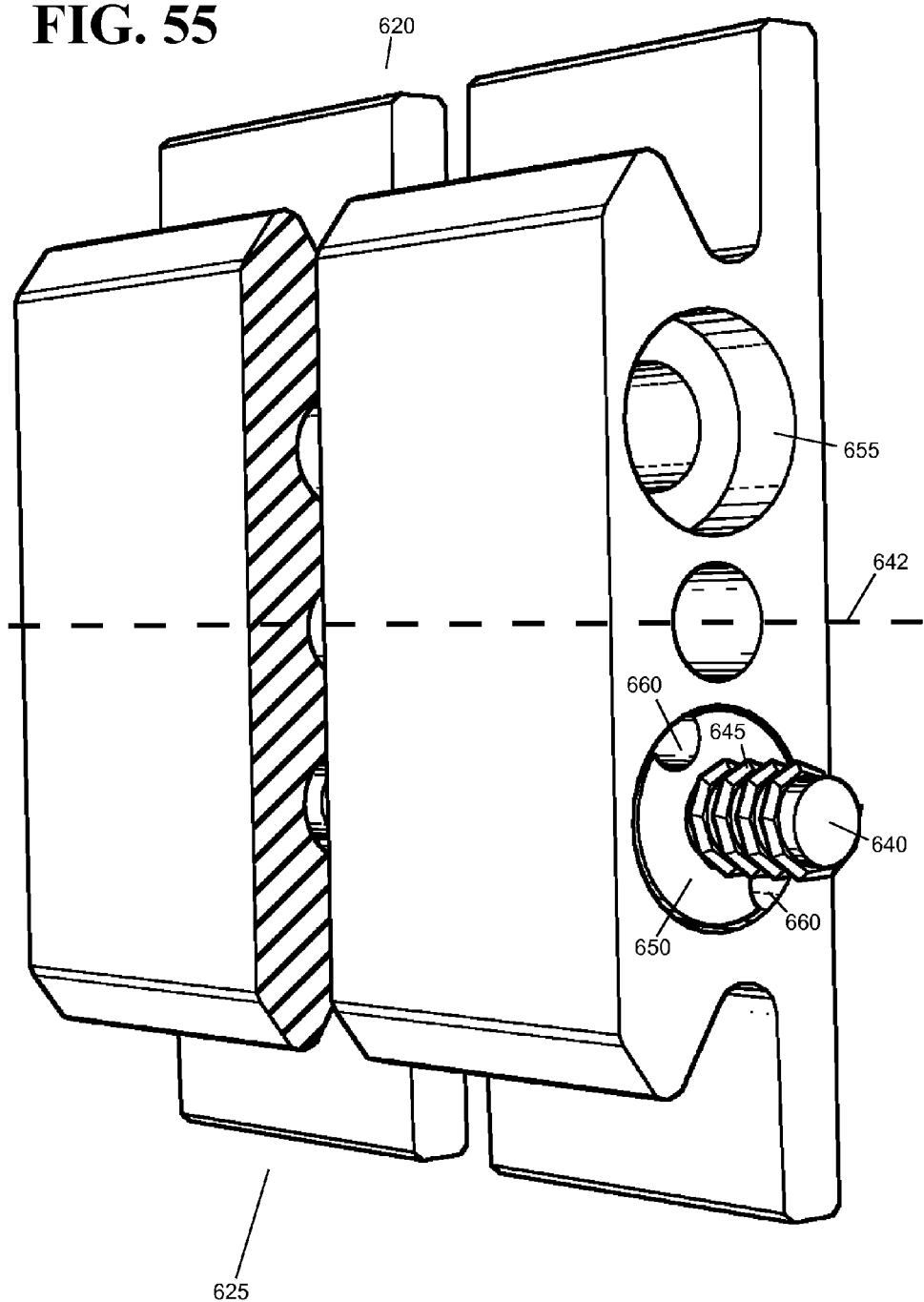
FIG. 55 is a side perspective view of a frame section with a tensioning system.

As shown in FIG. 4, the example frame sections 11 have three longitudinal channels 116 that extend through the frame. In FIGS. 55 through 57, the tensioning system is shown with a rod 640 that extends through the lower longitudinal channel 116 of the frame. The size of the illustrated rod 640 is substantially defined by the longitudinal channel 116, however it should be noted that the rod could be substantially smaller than the channel as long as it has sufficient nominal breaking strength to apply a large amount of compressive force on the frame section. While a rod is shown in the illustrated examples, wire or braided rope may also be utilized.

On the ends of the rod there are threads 645 which interact with a tensioning ring 650 located within a cutout portion 655 of the frame section 11. Clockwise rotation of the tensioning ring 650 causes the rod to be pulled outward which increases the amount of compressive force applied to the bottom of the frame section. While the tensioning ring 650 may be of any shape, the round shape in the illustrated example helps to spread out the compressive forces applied to the cutout portions of the frame. As shown, the tensioning ring 650 includes dimples 660 that are configured to interact with a tool such as the adjustable spanner wrench described in U.S. Patent Application publication 2002/0139225. The threading 645 on the rod 640 is preferably ultrafine to increase the amount of mechanical advantage generated when the tensioning ring is rotated.

Figure 58:
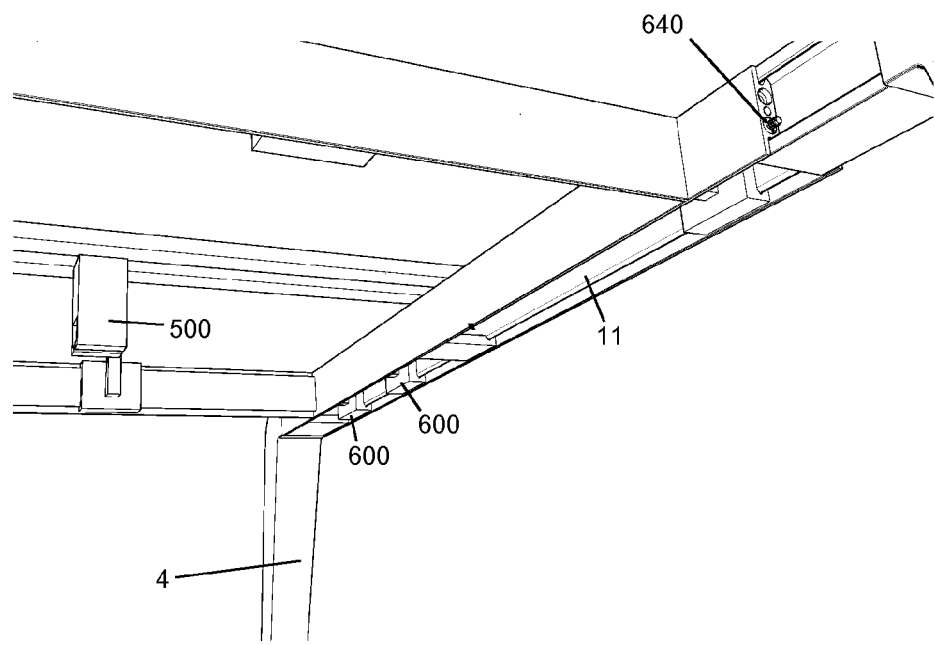
FIG. 58 is a lower perspective view of a table system with a frame tensioner, a quick release mechanism, and a sliding table top.

In the illustrated example, the frame section 11 has cutout portions 655 at the ends of the frame section adapted to receive the tensioning ring 650. The cutout portions are recessed into the frame such that the tensioning ring may be flush with, or fully within, the frame section 11. While the threaded ends of the rod are shown sticking out beyond the ends of the frame, it is expected that the cutout portions will be of sufficient depth such that the rods may also be fully enclosed by the frame. Alternatively, the ends of the rods that extend beyond the frame may be removed after the frame section has been tensioned. Additionally, both ends of the rod need not be threaded. In one embodiment, one end of the rod is fitted with a hexagonal nut that fits in an appropriately shaped cutout portion while the other end is threaded and has a tensioning ring. FIG. 58 illustrates a table system with a tensioning system, a quick release mechanism, and a slidable top.

FIGS. 55 and 57 illustrate a horizontal plane 642 that bisects the frame section. As shown in FIG. 57, the frame section 11 and the longitudinal channels 116 within the frame section are symmetrical about the horizontal plane. While the frame section may be symmetrical to allow for easy installation, the tensioning system is only located in the longitudinal channel below the horizontal plane.

The inventor contemplates several alterations and improvements to the disclosed invention. The frame may further include protective and/or decorative coatings such as paint. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the apparatus described. Instead, the scope of the present invention should be consistent with the invention claimed below.

We claim:
1. A table system comprising
a table top supported by a table frame with a first table leg having a clamping mechanism, the table frame including a first frame section extending parallel to a second frame section at the clamping mechanism, both frame sections clamped to the clamping mechanism;
each of the frame sections further including
a first flat side parallel to a second flat side, the first flat side having a first total surface area and the second flat side having a second total surface area, the first total surface area being smaller than the second total surface area,
an upper and lower terminal side extending from the first flat side to the second flat side,
each terminal side having a groove interlocked with the clamping mechanism;
a vertical construction secured directly above the first frame section, the vertical construction having a first interior wall and a second interior wall, both the interior walls extending perpendicular to the first flat side of the first frame sections, and the interior walls substantially defining a lower opening in the vertical construction; and
a quick release mechanism with
a first hinged clamp
secured against the first interior wall and
having a threaded aperture,
a second hinged clamp
secured against the second interior wall and
rotatably connecting with the first hinged clamp, and
a screw having
an end pressing against the second hinged clamp and
a threaded cylinder secured within the threaded aperture of the first hinged clamp.
2. The table system of claim 1 wherein
the quick release mechanism includes
a box surrounding both the first hinged clamp and the second hinged clamp,
wherein the screw passes through a wall of the box.
3. The table system of claim 2 wherein
the first interior wall has a first height,
the first hinged clamp includes a protrusion extending away from the second hinged clamp, and the protrusion is separated from the wall of the box by the first height.

4. The table system of claim 2 wherein
the first hinged clamp includes a concave region within the box contacting a convex region of the second hinged clamp.

5. The table system of claim 2 wherein
The second hinged clamp includes a concave region within the box contacting a convex region of the first hinged clamp.

6. The table system of claim 2 wherein
the quick release mechanism includes a cable raceway below the box.

7. The table system of claim 1 wherein
the quick release mechanism includes a modesty panel below the box.

8. The table system of claim 1 further comprising
a sliding assembly securing the table top to the first frame section, the sliding assembly including a C-shaped clamp slidably interconnected with both
   the groove of the first terminal side of the first frame section and
   the groove of the second terminal side of the first frame section.

9. The table system of claim 8 further comprising
a horizontal plane bisecting the first frame section,
the first frame section having
   a first and second end side,
      each end side
         perpendicular to the both the first and second flat side of the first frame section, and
         extending from the first terminal side of the first frame section to the second terminal side of the first frame section,
   an interior channel
      located between the first flat side and the second flat side and below the horizontal plane, and
      extending from the first end side to the second end side; and
a tensioning system in the interior channel pulling the first end side towards the second end side.

\* \* \* \* \*